United States Patent
Saito et al.

(10) Patent No.: US 10,834,524 B2
(45) Date of Patent: Nov. 10, 2020

(54) DELEGATING CLOUD-SIDE ROLES TO DEVICES

(71) Applicant: INTERNATIONAL BUSINESS MACHINES CORPORATION, Armonk, NY (US)

(72) Inventors: Akira Saito, Ichikawa (JP); Hayato Uenohara, Funabashi (JP); Satoshi Yokoyama, Ichikawa (JP); Gaku Yamamoto, Machida (JP); Sanehiro Furuichi, Setagaya (JP); Norie Iwasaki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/279,818

(22) Filed: Feb. 19, 2019

(65) Prior Publication Data
US 2020/0267495 A1    Aug. 20, 2020

(51) Int. Cl.
*H04W 4/021* (2018.01)
*H04L 29/08* (2006.01)
(Continued)

(52) U.S. Cl.
CPC ............ *H04W 4/021* (2013.01); *H04L 67/12* (2013.01); *H04W 4/026* (2013.01); *H04W 24/10* (2013.01); *H04L 41/0803* (2013.01); *H04L 67/10* (2013.01)

(58) Field of Classification Search
CPC ..... H04W 4/029; H04W 64/00; H04W 84/12; H04W 4/44; H04W 4/02; H04W 4/025;
(Continued)

(56) References Cited

U.S. PATENT DOCUMENTS

2011/0087603 A1*  4/2011  Garcia ................ G06F 16/9577
                                                                    705/55
2012/0284314 A1* 11/2012  Nagpal ............... H04L 67/2852
                                                                    707/822
(Continued)

FOREIGN PATENT DOCUMENTS

CN          108174391         6/2018
CN          108234671         6/2018
(Continued)

OTHER PUBLICATIONS

Lewis, G., et al., "Tactical Cloudlets: Moving Cloud Computing to the Edge", Proceedings of the 2014 IEEE Military Communications Conference (Oct. 6-8, 2014), Date added to IEEE Xplore: Nov. 20, 2014, Retrieved from the Internet at <http://elijah.cs.cmu.edu/DOCS/lewis-milcom2014.pdf>, 7 pp.
(Continued)

*Primary Examiner* — Daniel Lai
(74) *Attorney, Agent, or Firm* — Konrad Raynes Davda & Victor LLP; Janaki K. Davda

(57) ABSTRACT

Provided are techniques for delegating cloud-side roles to devices. Network quality information is received for a network from one or more devices. It is determined that the network is unavailable in an area from which the network quality information was received. For a new device, a trajectory path of the new device is predicted. It is determined that the new device is about to enter the area based on the trajectory path. One or more software modules and data are identified. The one or more software modules and the data are sent to the new device, wherein the new device executes the one or more software modules to generate one or more insights from the data.

24 Claims, 26 Drawing Sheets

(51) Int. Cl.
*H04W 24/10* (2009.01)
*H04W 4/02* (2018.01)
*H04L 12/24* (2006.01)

(58) Field of Classification Search
CPC ... H04W 4/046; H04W 72/085; H04W 4/027; H04W 4/40; H04W 24/02; H04W 36/30; H04W 40/20; H04W 4/50; H04W 4/60; H04W 64/003; H04W 72/1263; H04W 84/18; H04W 40/12; H04W 40/248; H04W 4/023; H04W 4/024; H04W 4/04; H04W 24/10; H04W 28/0215; H04W 28/0247; H04W 4/00; H04W 4/022; H04W 64/006; H04W 4/021; H04W 4/026; H04B 17/318; H04B 17/27; H04L 67/12; H04L 67/10; H04L 41/0803
See application file for complete search history.

(56) References Cited

U.S. PATENT DOCUMENTS

| | | | | |
|---|---|---|---|---|
| 2013/0308470 | A1* | 11/2013 | Bevan | H04W 16/28 370/252 |
| 2014/0086046 | A1 | 3/2014 | Reeves et al. | |
| 2015/0373560 | A1* | 12/2015 | Chu | H04W 24/02 370/252 |
| 2016/0021178 | A1 | 1/2016 | Liu et al. | |
| 2016/0044127 | A1* | 2/2016 | Filner | H04L 67/2847 709/213 |
| 2016/0173545 | A1* | 6/2016 | Miao | H04L 65/80 709/204 |
| 2017/0237809 | A1* | 8/2017 | Farinacci | H04L 67/1008 718/104 |
| 2017/0251339 | A1 | 8/2017 | Addepalli et al. | |
| 2017/0332344 | A1 | 11/2017 | Rao et al. | |
| 2017/0339510 | A1* | 11/2017 | Condeixa | H04W 4/70 |
| 2019/0149619 | A1* | 5/2019 | Lisac | H04L 67/2847 709/203 |
| 2019/0208001 | A1* | 7/2019 | Stumbo | H04L 65/4069 |

FOREIGN PATENT DOCUMENTS

| | | |
|---|---|---|
| WO | 2015057464 | 4/2015 |
| WO | 2015193727 | 12/2015 |

OTHER PUBLICATIONS

Mell, P., et al., "Effectively and Securely Using the Cloud Computing Paradigm", NIST, Information Technology Laboratory, Oct. 7, 2009, 80 pp.

Mell, P., et al., "The NIST Definition of Cloud Computing", Special Publication 800-145, Sep. 2011, 7 pp.

Munir, A., et al., "IFCIoT: Integrated Fog Cloud IoT Architectural Paradigm for Future Internet of Things", [online] 1701.08474v1, Distributed, Parallel, and Cluster Computing (cs.DC), Cornell University Library, Submitted Jan. 30, 2017, Retrieved from the Internet at <URL: https://arxiv.org/pdf/1701.08474.pdf>, 9 pp.

International Search Report and Written Opinion for International Application No. PCT/IB2020/051131, 9 pp., dated Jun. 4, 2020. [57.436 (ISR & WO)].

Abstract and Machine Translation for CN Publication No. 108174391, 23 pp., dated Jun. 15, 2018.

Abstract and Machine Translation for CN Publication No. 108234671, 23 pp., dated Jun. 29, 2018.

* cited by examiner

Logic Table in Logic Store — 600

| id | Meta logic for software module selection | Meta logic for data selection | Logic content |
|----|------------------------------------------|-------------------------------|---------------|
| 0 | getData().filter(type is "accident").count() > 5 | getData().filter(type is "accident").collect() | Alert("xxx") if device location is nearby data location |
| 1 | getData().filter(type is "animal").filter("bear" in payload).count() > 5 | getData().filter(type is "animal").filter("bear" in payload).collect() | Predict the bear's current location. Search route where device does not encounter the bear. |
| 2 | ... | ... | ... |

FIG. 6

Data Store 700

| id | longitude | latitude | link id (road id) | timestamp | type | payload |
|---|---|---|---|---|---|---|
| 0 | 139.781885 | 35.682549 | 1 | t0 | slippery road | ... |
| 1 | 139.783194 | 35.683182 | 1 | t1 | accident | ... |
| 2 | 139.768440 | 35.683856 | 1 | t2 | animal | "bear" |
| 3 | 139.783465 | 35.685111 | 2 | t3 | accident | ... |
| 4 | 139.782266 | 35.686367 | 2 | t4 | animal | "bear" |

③ Cloud analysis continuously runs analysis on the data store.
④ Analysis may result in updates to data as shown in this example.

Data Store (After)

| id | longitude | latitude | link id (road id) | timestamp | type | payload |
|----|-----------|----------|-------------------|-----------|------|---------|
| ... | 139.781885 | 35.682549 | 123 | ... | slippery road | ... |
| ... | 139.783194 | 35.683182 | 222 | ... | accident | ... |
| 11 | 139.768440 | 35.683856 | 985 | 13:15 | animal | "bearA" |
| ... | 139.783465 | 35.685111 | 2 | ... | accident | ... |
| 44 | 139.782266 | 35.686367 | 985 | 13:20 | animal | "bearA" |
| 55 | 139.786330 | 35.683856 | 987 | 13:25 | animal | "bearA" |
| 77 | 139.786330 | 35.684682 | 987 | 13:30 | animal | "bearA" |

(3) The new event entry is updated accordingly to match other animal events type of the same "bear" (="bearA").

As result, the new event entry is updated to be part of *the same time series data of the same "bear" (="bearA")*, allowing for predictive analysis of the latest "bear" movement (i.e. "what are the possible bear location(s) and its heading(s)?") in the cloud node or in the device.

DELEGATING CLOUD-SIDE ROLES TO DEVICES

BACKGROUND

1. Field of the Invention

Embodiments of the invention relate to delegating cloud-side roles to devices, while a network between a cloud node and the devices is unavailable to allow communication. In certain embodiments, the devices are Internet of Things (IoT) devices.

2. Description of the Related Art

Internet of Things (IoT) may be described as a network of devices that have software and hardware used to communicate with each other. That is, the devices (e.g., a thermostat in a home or a navigation system in a car) are able to exchange data.

A cloud node may be described as a computer in a cloud infrastructure.

As the IoT technology comes into widespread use, there are systems in which a cloud node collects data from IoT devices and processes the data. The cloud node also controls the IoT devices.

On the other hand, a mobile IoT device, such as a connected vehicle, sometimes loses connection to a network used for connecting to the cloud node or suffers unstable connection to the network because of geographic features, surroundings, radio wave conditions, etc. Under such conditions, the user of the IoT device may be unable to use a service provided by the cloud node.

In order to maintain a service on an IoT device under conditions where the network cannot be used, all or some of the functions of the cloud node are performed on the device. In such a case, processes that are dependent on data sent from another IoT device or the result of an analysis made on the cloud may not be performed.

SUMMARY

In accordance with embodiments, a computer-implemented method is provided for delegating cloud-side roles to devices. The computer-implemented method comprises operations. Network quality information is received for a network from one or more devices. It is determined that the network is unavailable in an area from which the network quality information was received. For a new device, a trajectory path of the new device is predicted. It is determined that the new device is about to enter the area based on the trajectory path. One or more software modules and data are identified. The one or more software modules and the data are sent to the new device, wherein the new device executes the one or more software modules to generate one or more insights from the data. This advantageously allows the device to continue to execute the one or more software modules to generate one or more insights from the data and, for example, predict a route even when the network is unavailable.

In accordance with other embodiments, a computer program product is provided for delegating cloud-side roles to devices. The computer program product comprising a computer readable storage medium having program code embodied therewith, the program code executable by at least one processor to perform operations. Network quality information is received for a network from one or more devices. It is determined that the network is unavailable in an area from which the network quality information was received. For a new device, a trajectory path of the new device is predicted. It is determined that the new device is about to enter the area based on the trajectory path. One or more software modules and data are identified. The one or more software modules and the data are sent to the new device, wherein the new device executes the one or more software modules to generate one or more insights from the data. This advantageously allows the device to continue to execute the one or more software modules to generate one or more insights from the data and, for example, predict a route even when the network is unavailable.

In accordance with yet other embodiments, a computer system is provided for delegating cloud-side roles to devices. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Network quality information is received for a network from one or more devices. It is determined that the network is unavailable in an area from which the network quality information was received. For a new device, a trajectory path of the new device is predicted. It is determined that the new device is about to enter the area based on the trajectory path. One or more software modules and data are identified. The one or more software modules and the data are sent to the new device, wherein the new device executes the one or more software modules to generate one or more insights from the data. This advantageously allows the device to continue to execute the one or more software modules to generate one or more insights from the data and, for example, predict a route even when the network is unavailable.

In additional embodiments, the network quality information is sent to the new device, sending the network quality information to the new device, wherein the new device uses the network quality information to determine that the network quality has improved as the device moves along the trajectory path to a new area. This advantageously allows the new device to determine when the network becomes available so that the new device is able to communication with a cloud node.

In yet additional embodiments, time series data is created with the network quality information, wherein the network quality information includes network bandwidth and the network latency. An average network bandwidth and an average latency are determined using the time series data. A network quality score of the area is generated from the average network bandwidth and the average network latency, wherein the network quality score is used to determine that the network is unavailable in the area from which the network quality information was received. This advantageously allows generating a network quality score using network bandwidth and network latency at different times (with the time series data).

In other embodiments, the network quality score is multiplied by an environmental coefficient. This advantageously allows the network quality score to take into consideration environment factors.

In yet other embodiments, the one or more software modules and the data are deleted from the new device after a duration. This advantageously allows the cloud node to set the duration and allows the device to delete the one or more software modules and the data to improve local storage.

In further embodiments, the new device sends sensor information from one or more sensor devices to a cloud node. This allows real-time data to be sent from the new device to the cloud node.

In yet further embodiments, the new device is an Internet of Things (IoT) device. This advantageously allows IoT devices to implement embodiments of the invention. In certain embodiments, a Software as a Service (SaaS) is configured to perform the operations for the method. This advantageously allows the operations to be offered as a service in a cloud environment.

BRIEF DESCRIPTION OF THE SEVERAL VIEWS OF THE DRAWINGS

Referring now to the drawings in which like reference numbers represent corresponding parts throughout:

FIG. 6 illustrates a logic table in a logic store in accordance with certain embodiments.

FIG. 7 illustrates a data table in a data store in accordance with certain embodiments.

FIGS. 17A and 17B illustrate analysis at the cloud node for the example route in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are directed to devices, such as Internet of Things (IoT) devices or other mobile devices, within vehicles. Embodiments predict the possibility of network disconnection on a scheduled route from network quality information in each location and from a current location of a device. Then, embodiments delegate one or more of the data processing functions of the cloud node to the device. The data processing functions are performed by software modules.

When functions are delegated, embodiments select and synchronize software modules (i.e., logic for performing the data processing functions) and data required for processing in a network disconnected area from the cloud node to the device so that the service may be maintained on the device during a certain period of time after the network becomes temporarily unavailable The network may be determined to be unavailable in an area if the network is unstable in that area (e.g., the device in an area of that network is unable to connect to the cloud node and send data or receive commands) or if the network is disconnected in that area.

Figure 1:
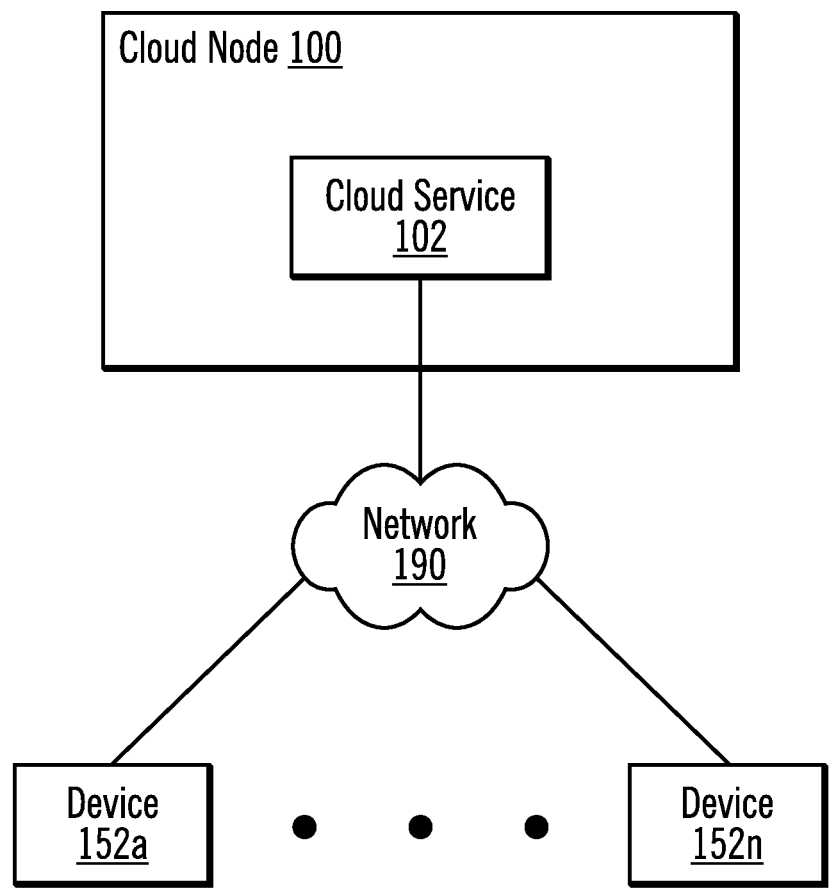
FIG. 1 illustrates, in a block diagram, a computing environment in accordance with certain embodiments.

FIG. 1 illustrates, in a block diagram, a computing environment in accordance with certain embodiments. In FIG. 1, a cloud service 102 is provided by a cloud node 100. The cloud service 102 (on the cloud side) is able to communicate through a network 190 with devices 152a ... 152n. The ellipses and use of "a" and "n" indicate that any number of devices may communicate with the cloud service 102.

Each of the devices 152a ... 152n has network capability. That is, each of the devices 152a ... 152n is able to communicate with the cloud service 102 at the cloud node 100 via the network 190. In certain embodiments, the devices are capable of 152a ... 152n communicating with each other. In certain embodiments, the devices 152a ... 152n are IoT devices or mobile devices that are able to communicate with the cloud node 100 and, in some cases, with each other.

Figure 2:
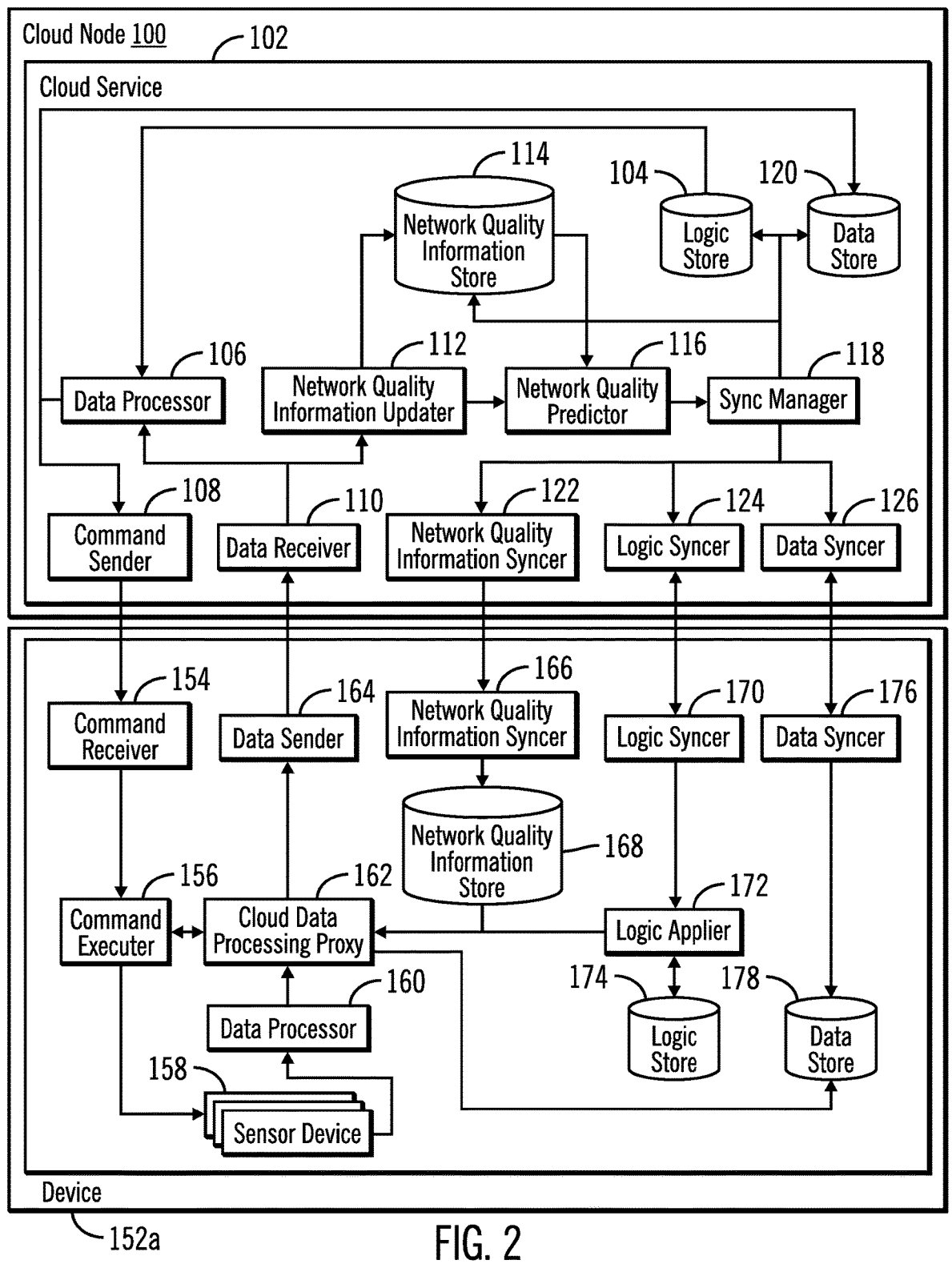
FIG. 2 illustrates, in a block diagram, further details of a computing environment in accordance with certain embodiments.

FIG. 2 illustrates, in a block diagram, further details of a computing environment in accordance with certain embodiments. In particular, FIG. 2 illustrates further details of the cloud service 102 and the device 152a. Each device 152a ... 152n communicating through the network 190 with the cloud service 102 includes the components shown for the device 152a in FIG. 2.

The device 152a includes one or more sensors 158 for collecting data in real-time. In certain embodiments one or more of the sensors 158 are weather sensors that detect, for example, temperature, humidity, atmospheric pressure, etc. In certain embodiments, one or more of the sensors 158 are in-vehicle sensors that detect, for example, speed, acceleration, Global Positioning Satellite (GPS) position, etc. With embodiments, data generated by a sensor device 158 on the device 152a is processed in a data processor 160, and then the processed data is sent via a cloud data processing proxy 162 and a data sender 164 to a data receiver 110 of the cloud service 102.

The cloud service 102 on the cloud side processes collected data and provides a service to service users. In addition, the cloud service 102 issues a command to the device 152a through a command sender 108 and is able to control the sensor device 158 on the device 152a.

The data receiver 110 on the cloud side transfers data received from the device 152a to a data processor 106 and provides information about the locations of the device 152a and information about conditions of the network (e.g., the network bandwidth and a network latency) to a network quality information ("info") updater 112.

With embodiments, multiple devices 152a . . . 152n are providing data from sensors to the cloud service 102, and the network quality information updater 112 receives locations of the devices 152a . . . 152n and information about conditions of the network from the multiple devices 152a . . . 152n. Later, when a subset of network quality information is sent to one of the multiple devices 152a . . . 152n, the subset of network quality information includes information about conditions of the network from the multiple devices 152a . . . 152n.

The network quality information updater 112 uses information received from the data receiver 110 to update network quality information and location information. The network quality information updater 112 also stores the updated network quality information and location information in a network quality information ("info") store 114.

The network quality information may be described as a mapping. The mapping is created that indicates what level of network quality is achieved and a location in which the level is achieved. The mapping is created from the location information of the device 152a from which data has been received, the network bandwidth, and the network latency.

In certain embodiments, the network quality information is configured based on network information collected from many devices 152a . . . 152n. When each device 152a . . . 152n sends data, that device 152a . . . 152n may add information about an area in which the device 152a . . . 152n has not been able to connect to the network 190 to send the data. In certain embodiments, the network quality information in each location may be acquired from an external organization, such as a communication carrier.

In certain embodiments, the devices 152a . . . 152n may be vehicle navigation devices that are in vehicles. The vehicles may be cars, boats, airplanes, motorcycles, bicycles, etc. The vehicle navigation devices may be dedicated communication devices.

The network quality information updater 112 sends location information of the device 152a to a network quality predictor 116.

The network quality predictor 116 predicts network quality in the vicinity of the device 152a based on the received location information and additional information in the network quality information store 114. If the network quality predictor 116 predicts that the network quality will decrease below a network quality threshold, the network quality predictor 116 determines that data processing functions on the cloud node 100 should be delegated to the device 152a. In certain embodiments, the network quality threshold is based on, for example, radio field intensity, packet loss ratio, jitter, latency, etc. Examples of data processing functions include, for example, image recognition, numerical analysis of sensor data, driving behavior analysis, etc.

If the network quality predictor 116 determines that processing functions are to be delegated, the network quality predictor 116 directs a sync manager 118 to perform synchronization.

The sync manager 118 selects software modules and data for executing the processing functions on the device 152a in the area in which the processing functions are delegated from a logic store 104 (in which software modules used by the cloud side for data processing are stored) and a data store 120 (in which data used by the cloud side for data processing are stored). Then, the sync manager 118 sends selected software modules to a logic syncer 124 and sends selected data to a data syncer 126. In addition, the sync manager 118 selects information from the network quality information store 114 on the cloud side and sends the information to a network quality information syncer 122. In certain embodiments, the information from the network quality information store 114 is selected based on a location of the device 152a that is to receive the information and a trajectory path of that device 152a.

The logic syncer 124 sends the selected software modules to a logic syncer 170 on the device 152a. The software modules may be program code or rules to be executed by the cloud data processing proxy 162 on the device 152a. In certain embodiments, a rules engine is a sub-component of the cloud data processing proxy 162 and executes the software modules. In certain embodiments, priorities may be assigned to multiple software modules and a software module with higher priority may be selectively sent, depending on the conditions of the device 152a.

The sync manager 118 may set a valid duration for each software module and associated data. Once the duration ends, each software module and associated data expire and are automatically deleted from the device 152a.

The data syncer 126 sends the selected data to a data syncer 176 on the device 152a. The data may include data from another device and may also include the results of analysis made on the cloud node 100.

The network quality information syncer 122 sends the selected network quality information to the network quality information syncer 166 on the device 152a.

The logic syncer 170 sends a received software module to a logic applier 172. The logic applier 172 applies the software module to a cloud data processing proxy 162. The logic applier 172 may also store the software module in a logic store 174, and the software module may be changed depending on conditions.

The data syncer 176 stores received data in a data store 178.

The network quality information syncer 166 stores received information in a network quality information store 168.

The cloud data processing proxy 162 executes the software module to generate ("obtain" or "identify") one or more insights from data. The cloud data processing proxy 162 may store the one or more insights in the data store 178.

If a command is to be issued as a result of the data processing, the cloud data processing proxy 162 sends the command to a command executer 156.

The cloud data processing proxy 162 determines, from information in the network quality information store 168, whether to attempt communication with the cloud node 100 in the current location. If the cloud data processing proxy 162 determines that communication is to be attempted, the cloud data processing proxy 162 sends insights stored in the data store 178 as a result of the data processing by the cloud data processing proxy 162 to the cloud node 100 through a data sender 164.

In certain embodiments, priorities may be assigned to insights and insights with higher priorities may be transferred, without transferring other insights or before transferring other insights. For example, when the device 152*a* is approaching the next network disconnected area, insights with high priorities may be transferred to the cloud node 100.

When the cloud node 100 detects reconnection of the device 152*a*, the cloud node 100 cancels function delegation based on a new determination by the network quality predictor 116.

The network quality predictor 116 and the quality information updater 112 may change frequency of updates depending on conditions and may enable a frequency of updates to be set in accordance with a real environment. A real environment may be described as the stability of network connection around the device 152*a* at a current time. Embodiments dynamically adjust the update frequency based on the network stability in an area, which depends on the location of the device 152*a* and its surrounding environment.

More specifically, the frequency of data transmission from the device 152*a* located near an area where the network connection is unavailable may be increased to improve the accuracy of network connection instability prediction in that area.

Figure 3:
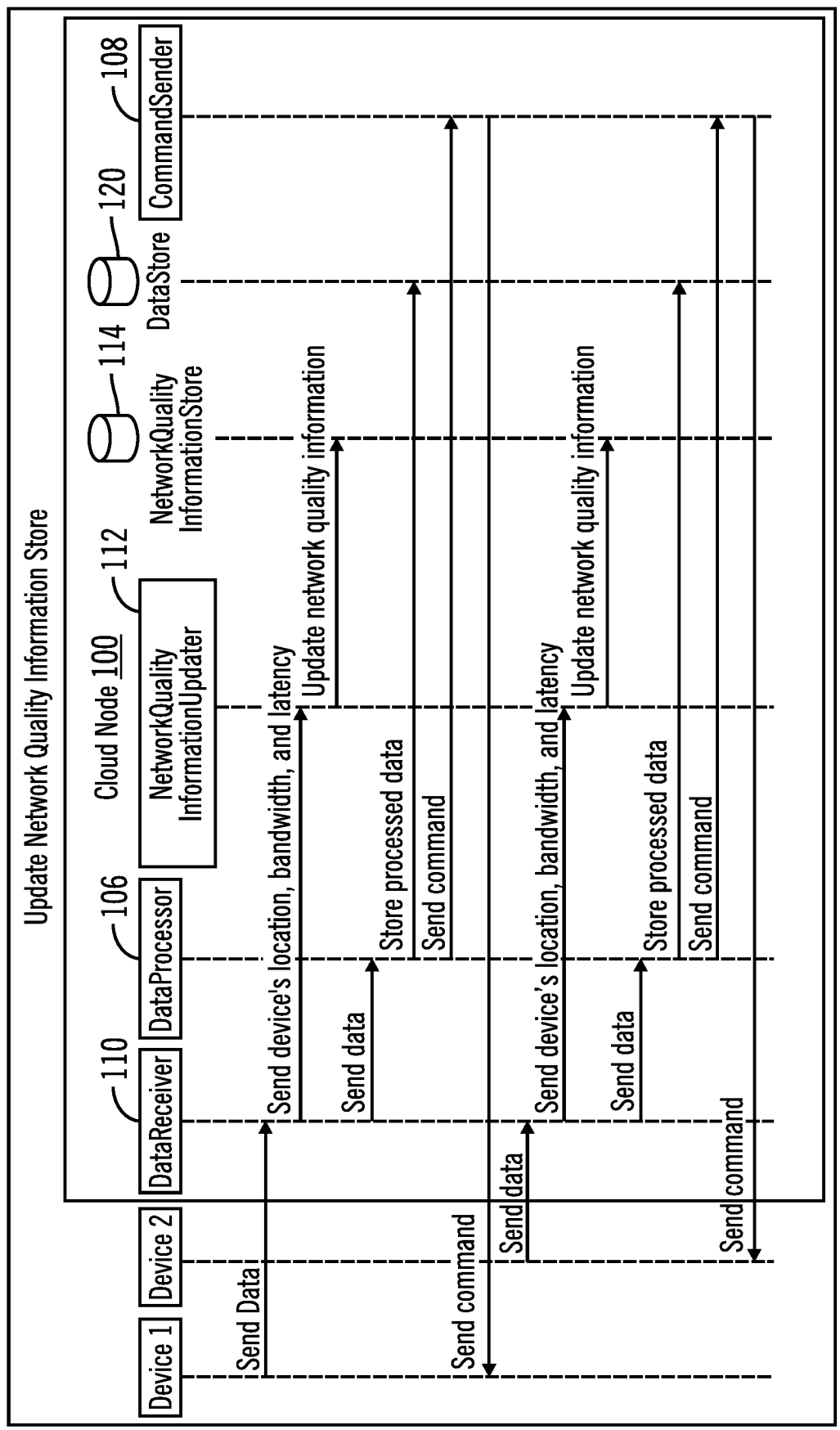
FIG. 3 illustrates a flow for updating the network quality information store in the cloud node in accordance with certain embodiments.

FIG. 3 illustrates a flow 300 for updating the network quality information store 114 in the cloud node 100 in accordance with certain embodiments. Initially, device 1 and device 2 send data to the data receiver 110. The data receiver 110 sends data to the data processor 106. The data processor 106 processes the data, stores the processed data in the data store 120, and sends a command via the command sender 108 to each device (device 1 and device 2). In certain embodiments, the command is an instruction given to each device to operate or change the status of that device (e.g., turning on a light, showing message on a screen, etc.). In certain embodiments, the specific command sent is dynamically determined based on rules. In certain embodiments, the processed data includes insights generated from the data received from the devices.

The data receiver 110 sends each device's location, network bandwidth, and network latency to the network quality information updater 112. The network quality information updater 112 updates each device's location, network bandwidth, and network latency in the network quality information store 114.

Figure 4:
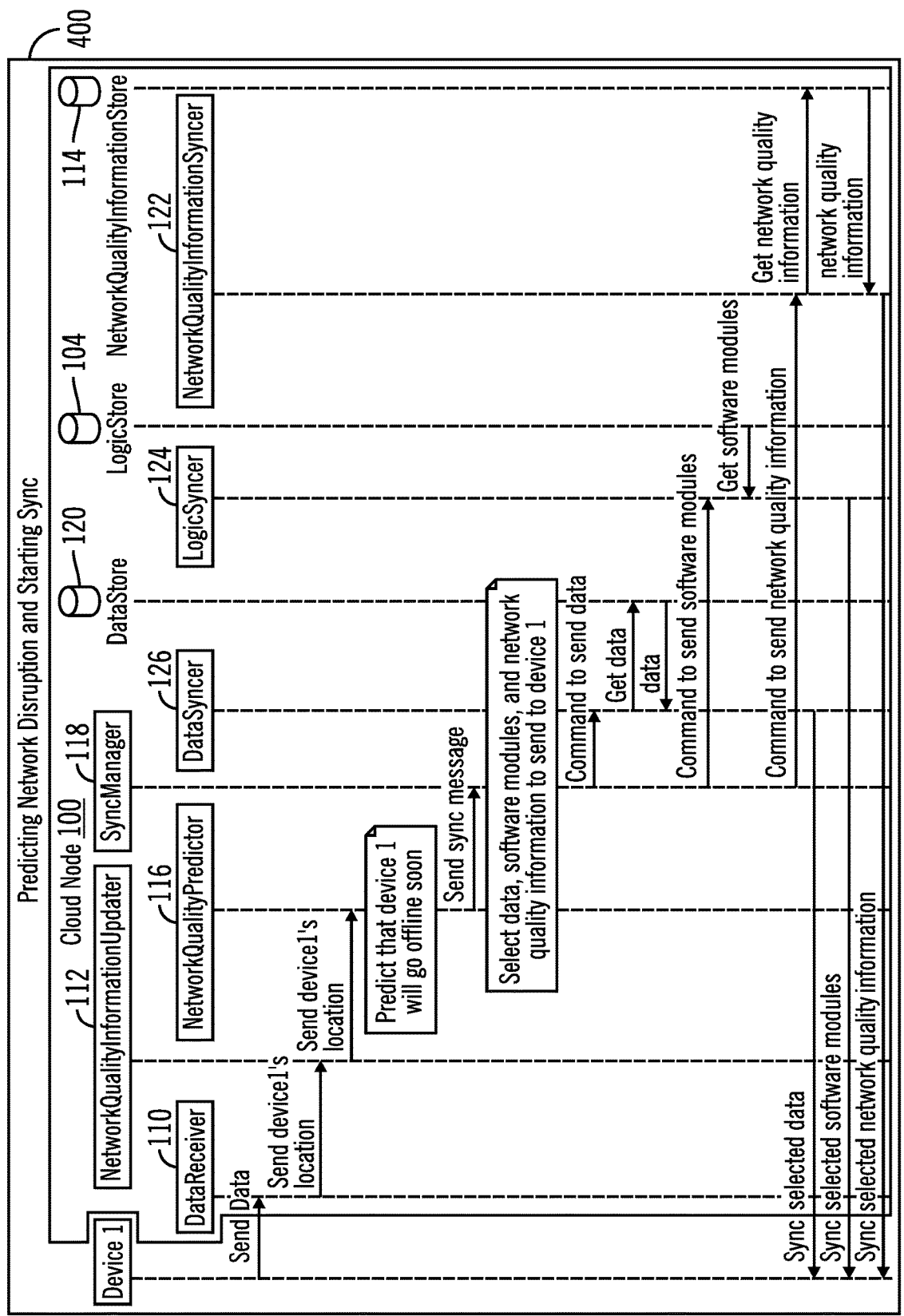
FIG. 4 illustrates a flow for predicting network disruption and starting sync in the cloud node in accordance with certain embodiments.

FIG. 4 illustrates a flow 400 for predicting network disruption and starting sync in the cloud node 100 in accordance with certain embodiments. Initially, device 1 sends data to the data receiver 110. The data receiver 110 sends the location of the device 1 to the network quality information updater 112, which sends the location of the device 1 to the network quality predictor 116. The network quality predictor 116 performs analysis to make a prediction that device 1 will go off-line soon (due to a network disruption) and sends a sync message to the sync manager 118. The sync manager 118 selects data, software modules, and network quality information. Then, the sync manager 118 sends a command to send the data to the data syncer 126, sends a command to send the software modules to the logic syncer 124, and sends a command to send the network quality information to the network quality information syncer 122. The data syncer 126 retrieves the data form the data store 120 and sends the data to the device 1. The logic syncer 124 retrieves the software modules from the logic store 104 and sends the software modules to the device. The network quality information syncer 122 retrieves the network quality information from the network quality information store 114 and sends the network quality information to the device 1.

Figure 5:
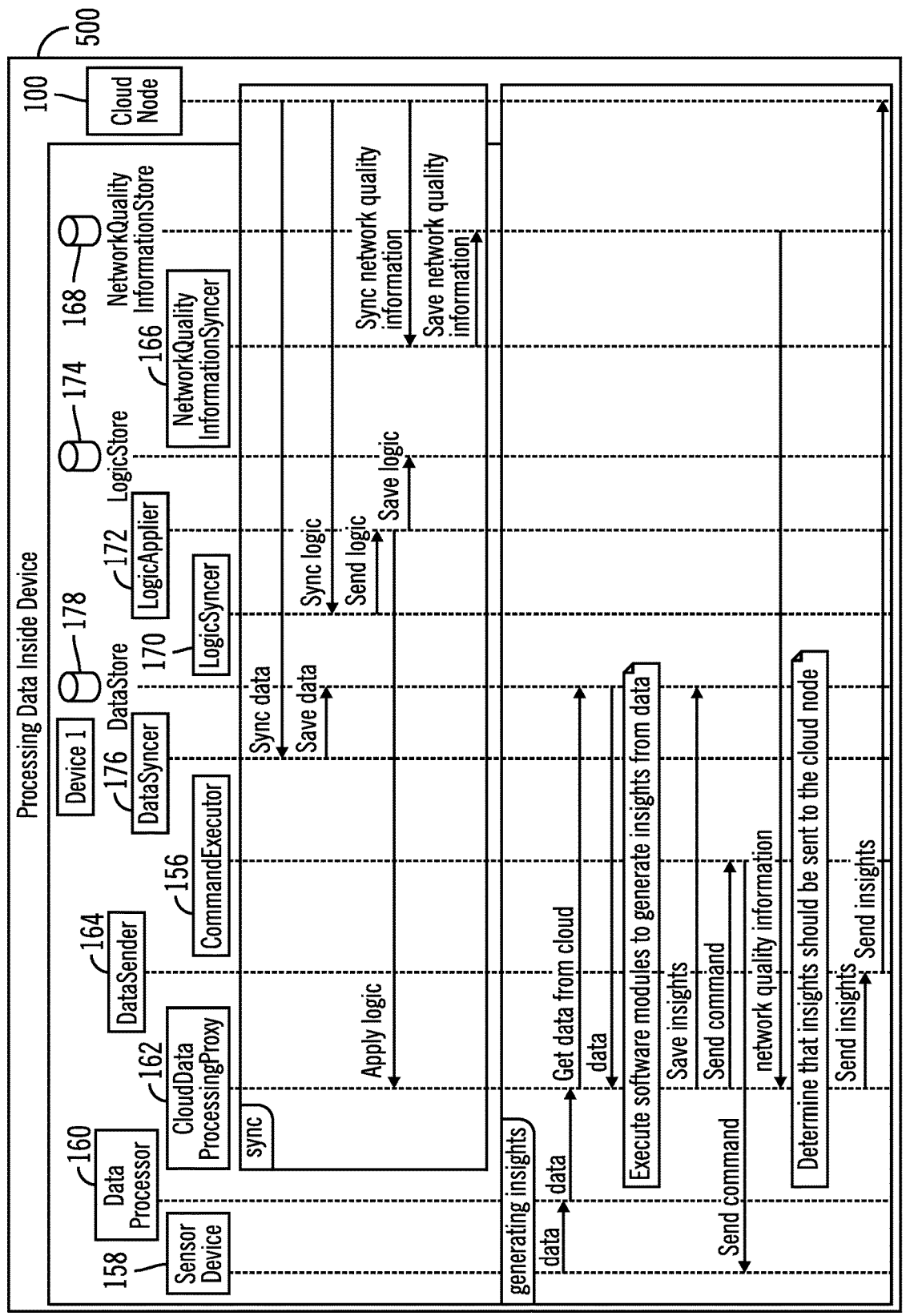
FIG. 5 illustrates a flow for syncing data and generating insights using software modules in a device in accordance with certain embodiments.

FIG. 5 illustrates a flow 500 for syncing data and generating insights using software modules in a device in accordance with certain embodiments. To sync data, 1) the data syncer 176 receives data and stores the data in the data store 178, 2) the logic syncer 170 receives software modules and sends the software modules to the logic applier 172, and 3) the network quality information syncer 166 receives network quality information and stores the network quality information in the network quality information store 168. The logic applier 172 stores the software modules in the logic store 174 and sends the software modules to the cloud data processing proxy 162. The cloud data processing proxy 162 executes the software modules using the data.

To generate insights, the sensor device 158 sends data to the data processor 160, which sends the data to the cloud data processing proxy 162. The cloud data processing proxy 162 retrieves data previously stored in the data store 178, which is data previously sent from the cloud node 100. The cloud data processing proxy 162 executes the software modules to generate one or more insights from the data, saves the one or more insights into the data store 178, and sends a command to the command executer 156. The command executer 156 sends the command to the sensor device 158. The cloud data processing proxy 162 obtains network quality information from the network quality information store 168, determines that the one or more insights should be sent to the cloud node based on the network quality information, and sends the one or more insights to the data sender 164. The data sender 164 sends the data to the cloud node 100.

FIG. 6 illustrates a logic table 600 in a logic store in accordance with certain embodiments. The logic table 600 includes a column for an identifier for each row, a column for meta logic for software module selection, a column for meta logic for data selection, and a column for logic content. Meta logic may be described as program code or rules to be executed by the sync manager 118. The logic store 104 and the logic store 174 may store the logic table 600.

The meta logic for software module selection is executed for each entry in the logic store 104 and a determination is made as to whether to select the software module in the entry for sending to the device. The meta logic for logic selection performs processing using data in the data store 120. In doing this, the data to be used in the software module selection may be narrowed down based on network quality information and information about the area into which the device will move. For example, a software module may be selected using data that belongs to a low-network-quality area into which the device will move. Alternatively, data that belongs to the area and an area adjoining the area may be used. A specific technique for narrowing down data may be described in the meta logic.

A meta logic for data selection for a selected entry is executed to select data. As a result of the execution of the meta logic for software module selection, the priority of the software module (or entry) may be acquired. In certain embodiments, the priority is embedded into the meta logic for data selection. In certain alternative embodiments, the priority is determined based on various factors.

FIG. 7 illustrates a data table 700 in a data store in accordance with certain embodiments. The data table 700 includes a column for an identifier for each row, a column for a longitude, a column for a latitude, a column for a link identifier (e.g., a road identifier), a column for a timestamp, a column for a type of link, and a column for a payload (which is data). The longitude and the latitude provide a location of a device. The data store 120 and the data store 178 may include the data table 700.

Figure 8:
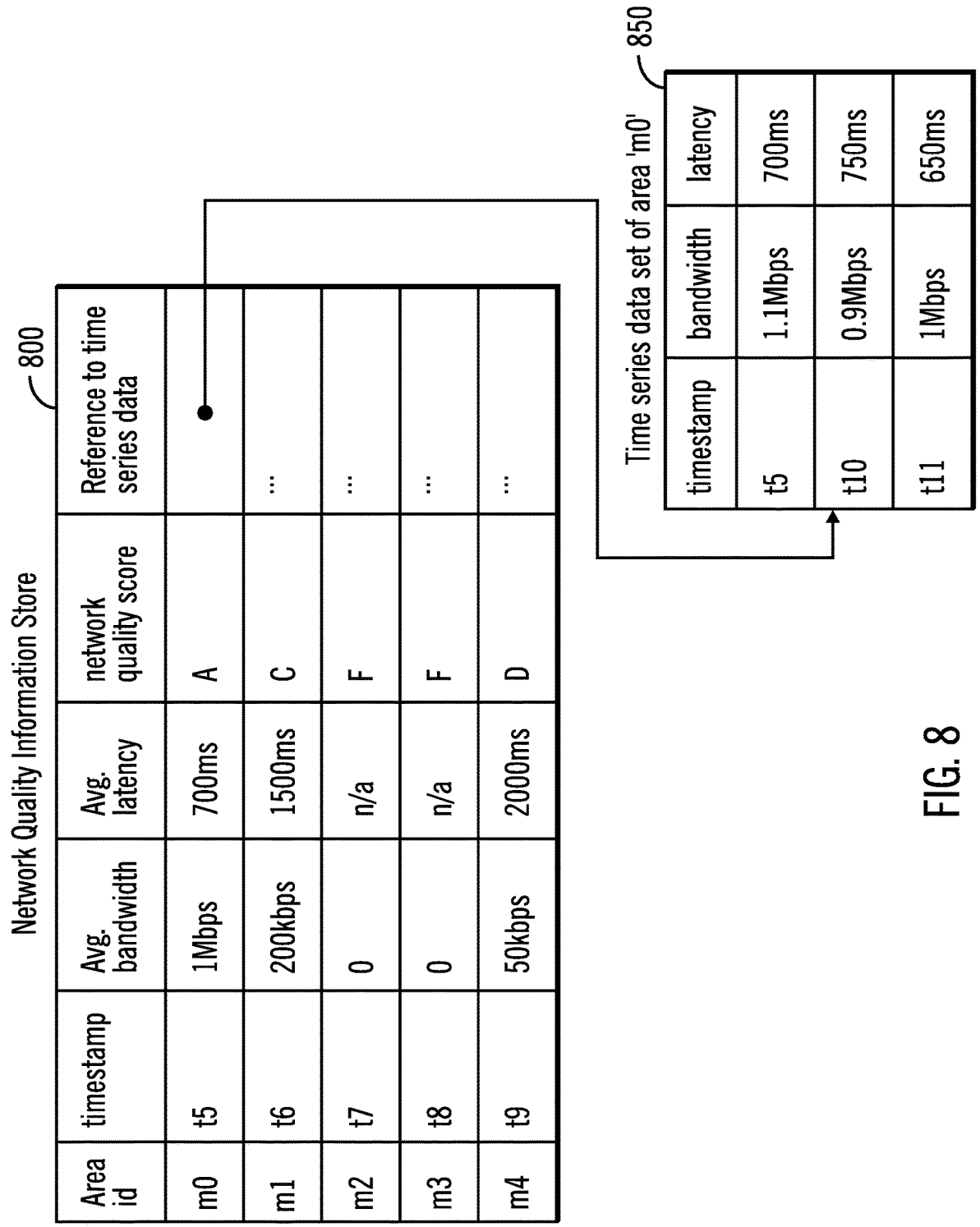
FIG. 8 illustrates a network quality information store in accordance with certain embodiments.

FIG. 8 illustrates a network quality information store 800 in accordance with certain embodiments. The network quality information store 800 has a column for an area identifier, a column for a timestamp, a column for average network bandwidth, a column for average network latency, a column for a network quality score, and a column with a reference to time series data. For example, time series data 850 has a column for a timestamp, a column for network bandwidth, and a column for network latency. The average network bandwidth is an average based on the network bandwidths in the time series data. The average network latency is an average based on the network latency in the time series data.

In FIG. 8, "Mbps: stands for megabits per second, "kbps" stands for kilobits per second, and "ms" stands for millisecond.

Figure 9:
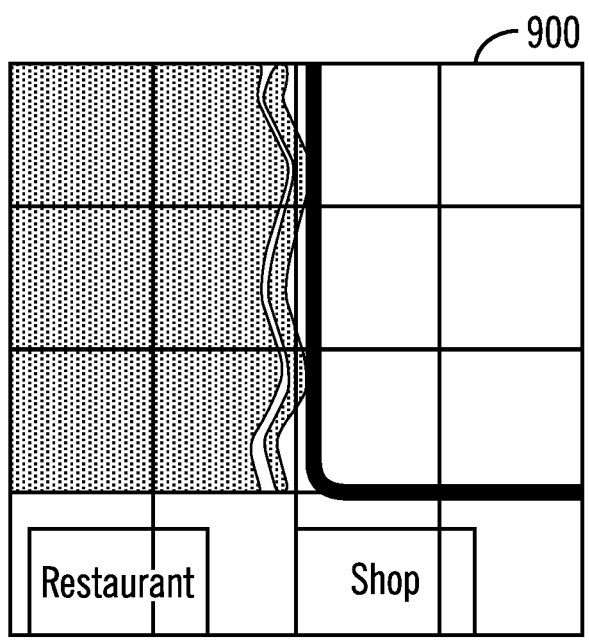
FIG. 9 illustrates a map in accordance with certain embodiments.

FIG. 9 illustrates a map 900 in accordance with certain embodiments. In certain embodiments, the map 900 is divided into a grid of square areas. Mapping of location information to the areas may be performed using a computational formula (e.g., numbers may be assigned to the areas based on latitudes and longitudes, such as with Open Street Map (OSM) tile numbering).

Information about network bandwidths and network latencies sent from devices is stored as time-series data for each area, and the average network bandwidth and the average network latency in each area are calculated and stored.

The network quality scores in the areas are calculated from the average network bandwidths and average network latencies.

In order to accommodate changes in available network quality information depending on environmental factors, such as bad weather or congestion conditions in each area, environmental coefficients corresponding to the environmental factors may be defined, and the calculated network quality score may be multiplied by the environmental coefficient to generate a final network quality score.

Figure 10A:
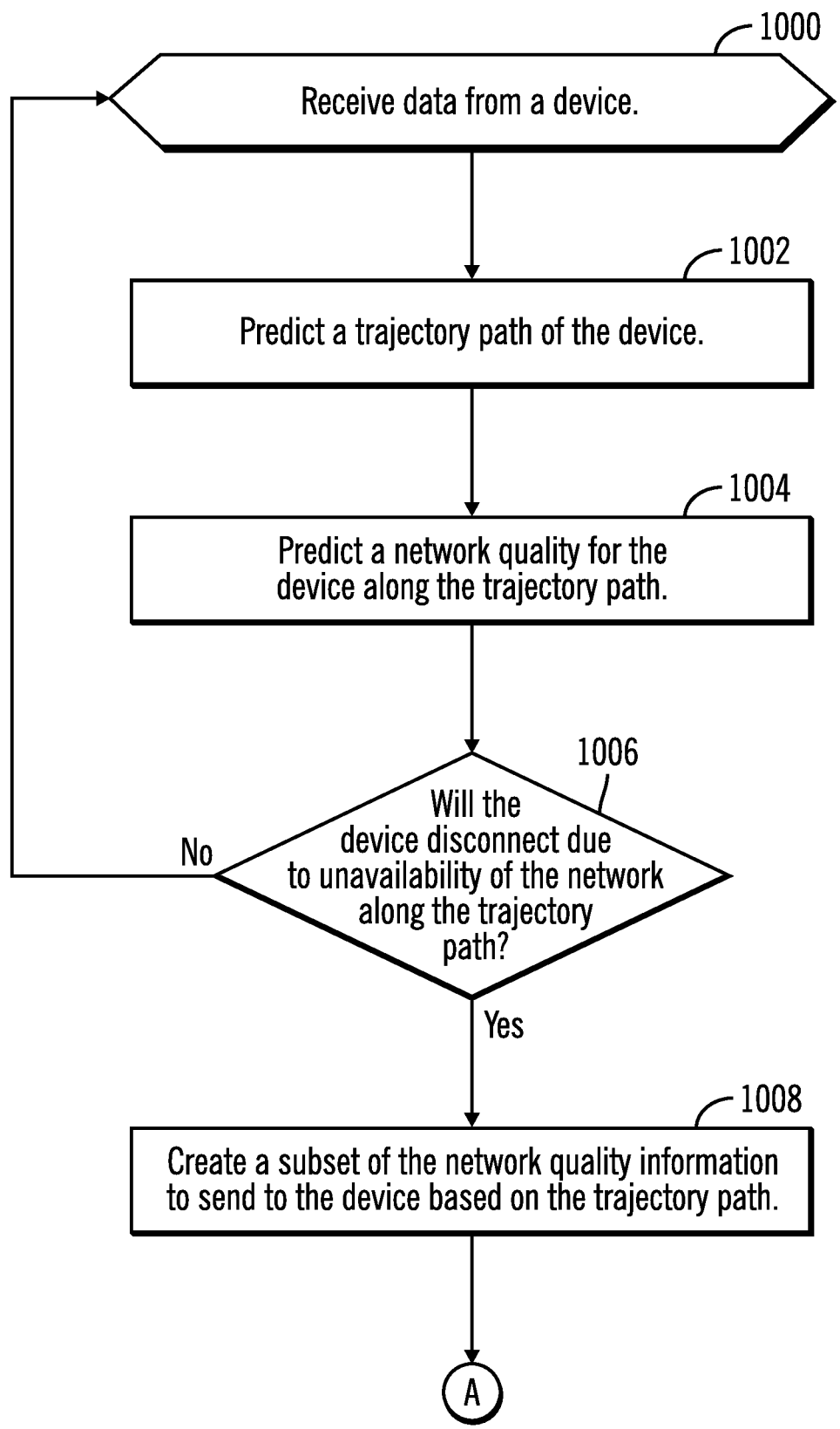
FIGS. 10A and 10B illustrate, in a flow chart, operations for selecting one or more software modules, data, and network quality information at a cloud node in accordance with certain embodiments.
Figure 10B:
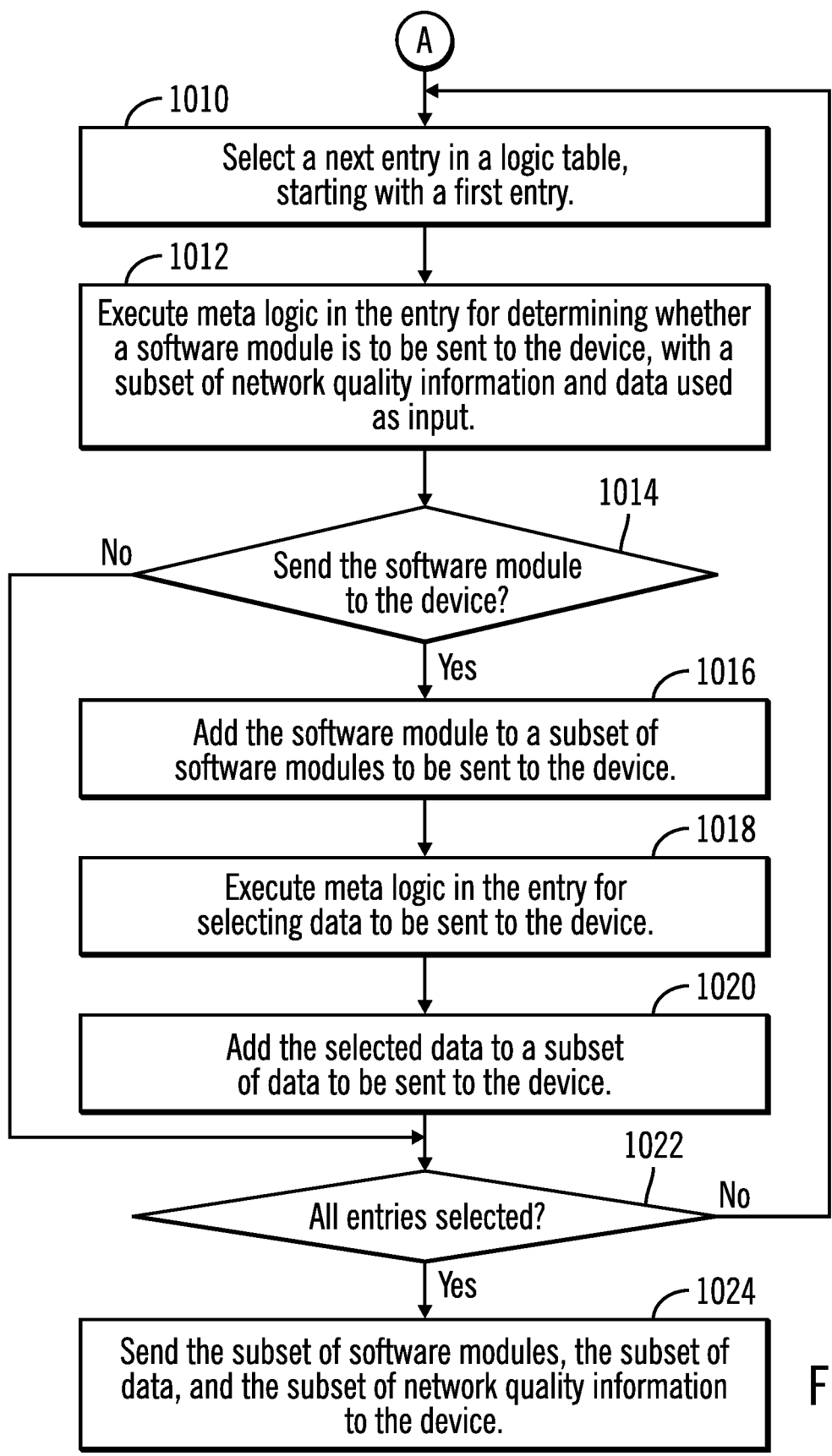

FIGS. 10A and 10B illustrate, in a flow chart, operations for selecting one or more software modules, data, and network quality information at a cloud node in accordance with certain embodiments. Control begins at block 1000 with the cloud service 102 receiving data from a device 152a. In block 1002, the cloud service 102 predicts a trajectory path (route) of the device 152a. In block 1004, the cloud service 102 predicts a network quality for the device 152a along the trajectory path. The predicted trajectory path may be described as a route that the vehicle is likely to take through one or more areas. The trajectory path for a device of a vehicle may be predicted based on a route entered into a navigation device for the vehicle, based on a route that the device of the vehicle has traveled in the past around the same time (e.g., going to work or coming home at the end of the day), or based on other information, such as points of interest that the vehicle may be traveling to.

In block 1006, the cloud service 102 determines whether the device 152a will disconnect due to unavailability of the network along the trajectory path. If so, processing continues to block 1008, otherwise, processing continues to block 1000.

In block 1008, the cloud service 102 creates a subset of the network quality information to send to the device 152a based on the trajectory path. From block 1008 (FIG. 10A), processing continues to block 1010 (FIG. 10B). In certain embodiments, the subset of the network quality information includes information about network quality in one or more areas from one or more of the devices 152a . . . 152n.

In block 1010, the cloud service 102 selects a next entry in a logic table, starting with a first entry. In block 1012, the cloud service 102 executes meta logic in the entry for determining whether the software module is to be sent to the device 152a, with a subset of network quality information from the network quality information store 114 and data from the data store 120 used as input.

In block 1014, the cloud service 102 determines whether the software module is to be sent to the device 152a. If so, processing continues to block 1016, otherwise, processing continues to block 1022.

In block 1016, the cloud service 102 adds the software module to a subset of software modules to be sent to the device 152a. In block 1018, the cloud service 102 executes meta logic in the entry for selecting data to be sent to the device 152a. In block 1020, the cloud service 102 adds the selected data to a subset of data to be sent to the device 152a.

In block 1022, the cloud service 102 determines whether all entries have been selected. If so, processing continues to block 1024, otherwise, processing continues to block 1010. In block 1024, the cloud service 102 sends the subset of software modules, the subset of data, and the subset of network quality information to the device 152a.

Figure 11A:
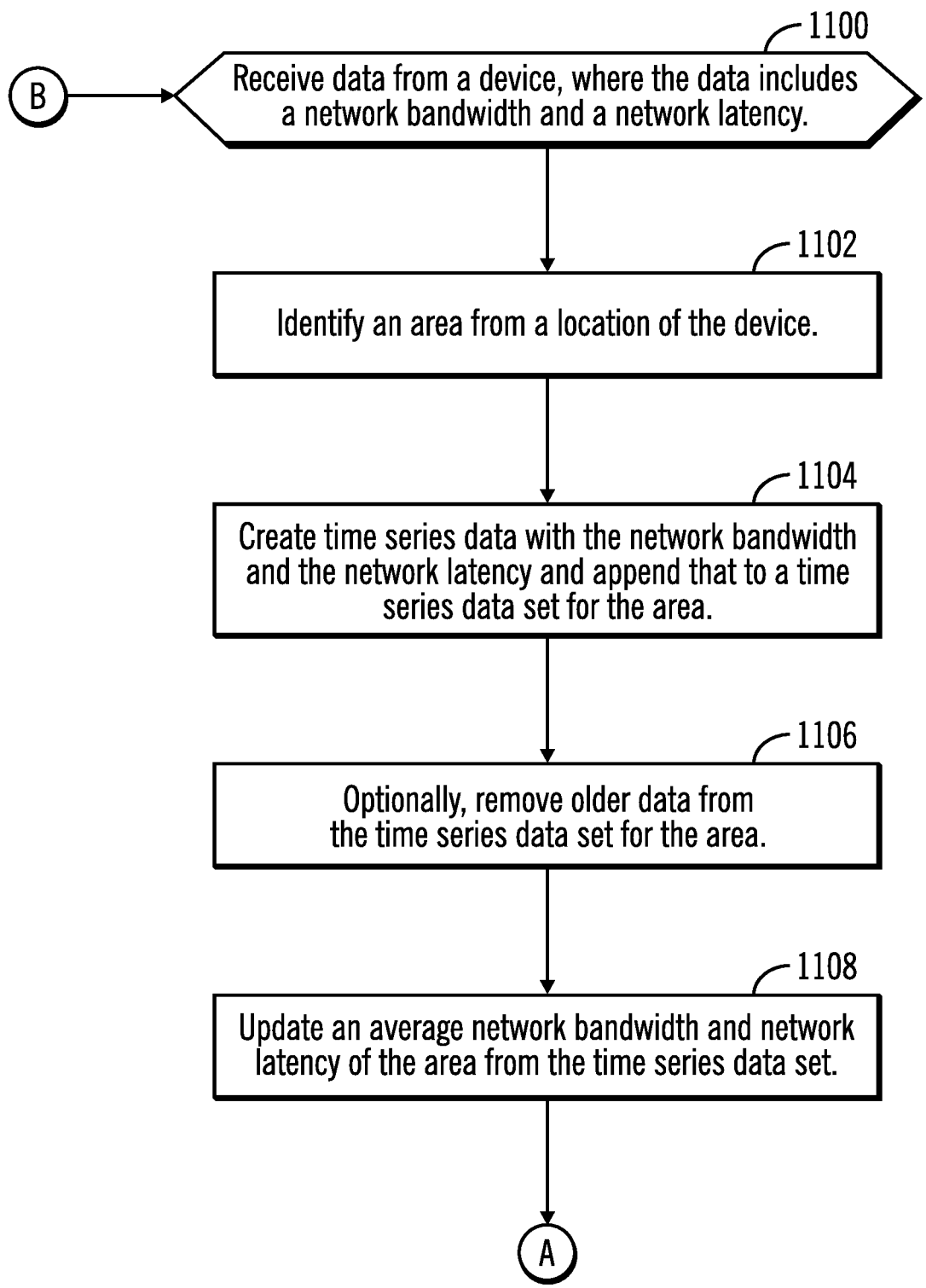
FIGS. 11A and 11B illustrate, in a flow chart, operations for updating a network quality information store at a cloud node in accordance with certain embodiments.
Figure 11B:
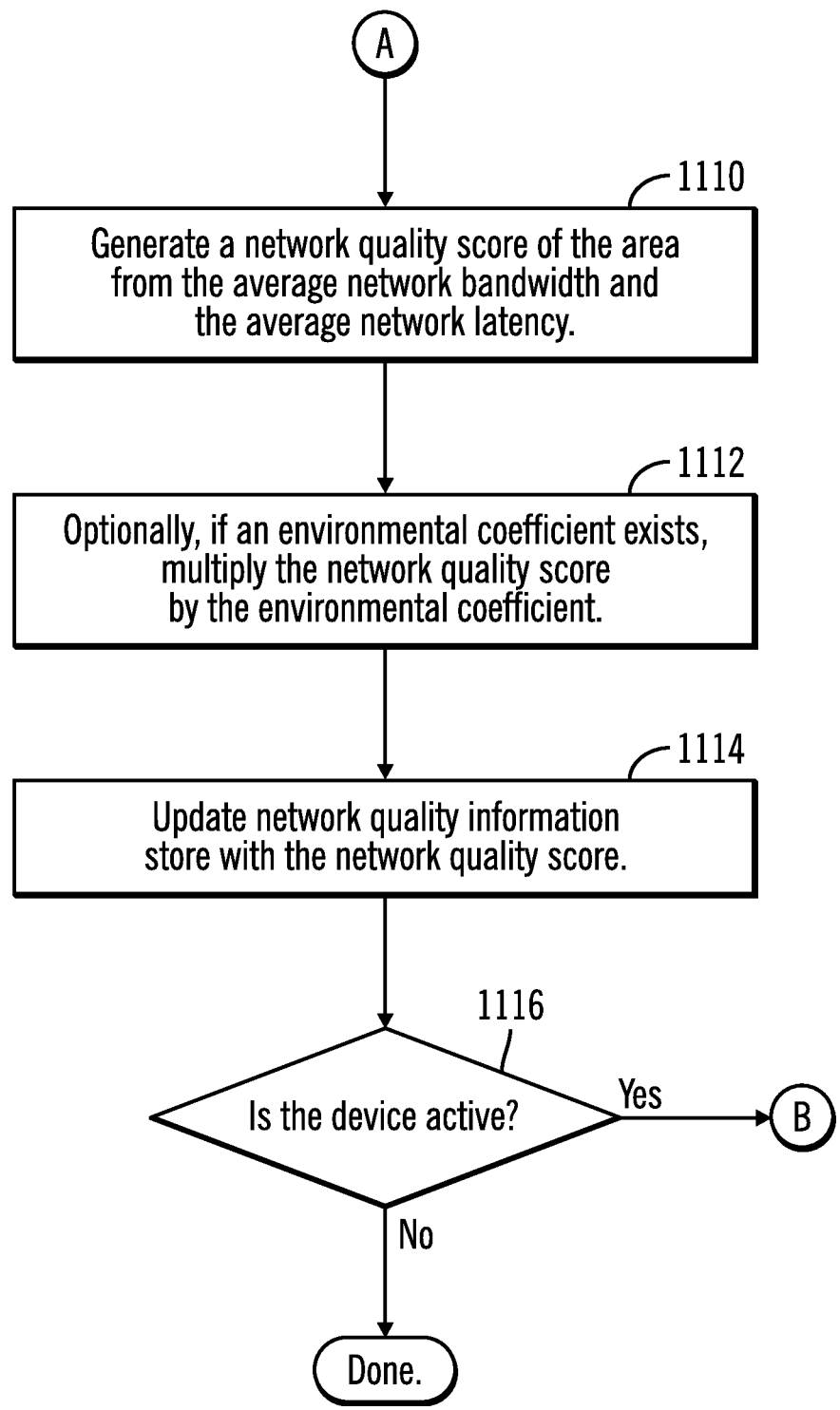

FIGS. 11A and 11B illustrate, in a flow chart, operations for updating a network quality information store at a cloud node in accordance with certain embodiments. Control begins at block 1100 with the cloud service 102 receiving data from a device 152a, where the data includes a network bandwidth and a network latency. In block 1102, the cloud service 102 identifying an area from a location of the device.

In block 1104, the cloud service 102 creates time series data with the network bandwidth and the network latency and append that to a time series data set for the area. In block 1106, the cloud service 102, optionally, removes older data from the time series data set for the area.

In block 1108, the cloud service 102 updates an average network bandwidth and network latency of the area from the time series data set. From block 1108 (FIG. 11A), processing continues to block 1110 (FIG. 11B).

In block 1110, the cloud service 102 generates a network quality score of the area from the average network bandwidth and the average network latency. In block 1112, the cloud service 102, optionally, if an environmental coefficient exists, multiplies the network quality score by the environmental coefficient. In block 1114, the cloud service 102 updates the network quality information store 114 with the network quality score. In certain embodiments, the network quality information includes the network quality score.

In block 1116, the cloud service 102 determines whether the device 152a is active (e.g., communicating via the network and sending data to the cloud service 102). If so, processing continues to block 1100, otherwise, processing is done.

Figure 12:
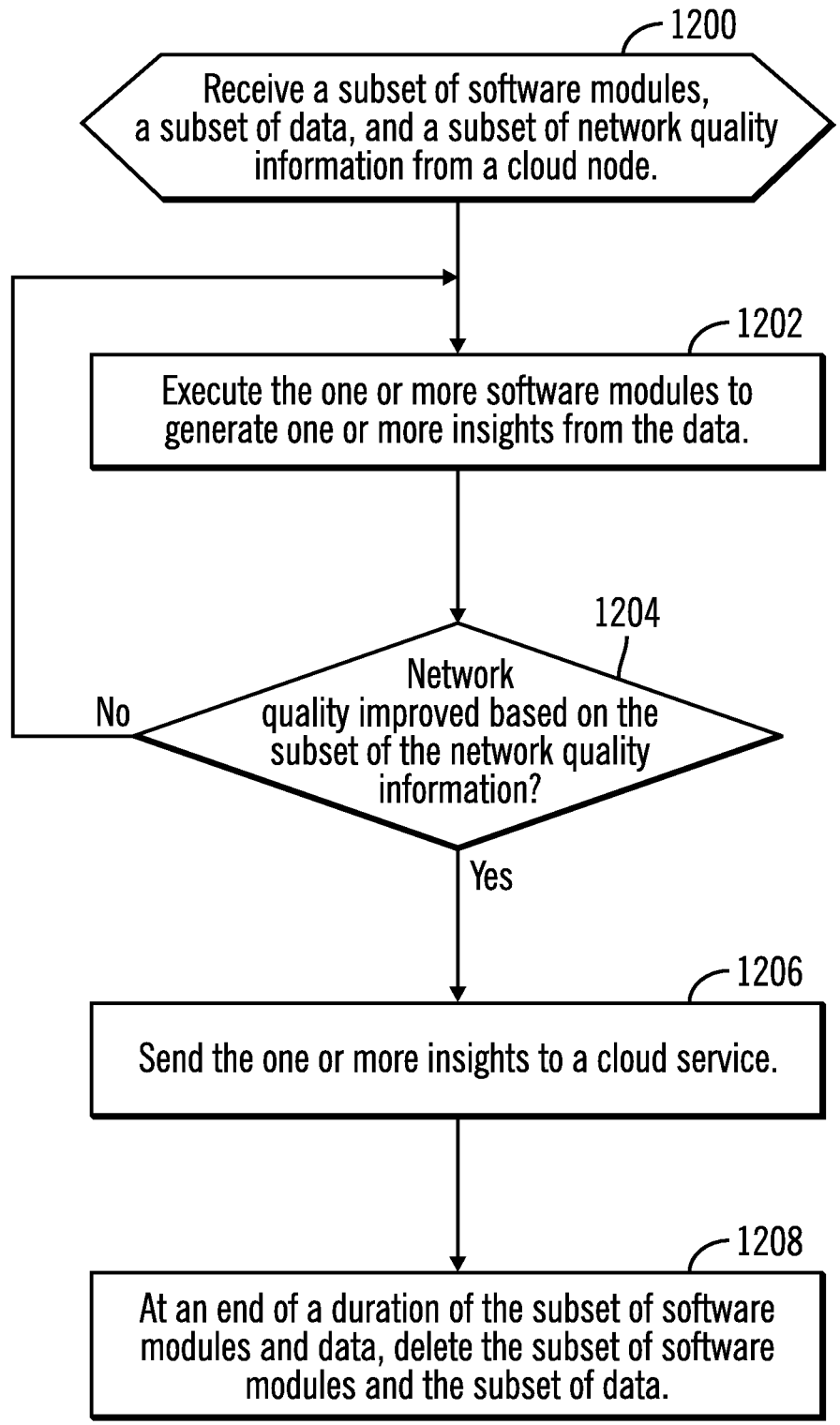
FIG. 12 illustrates, in a flow chart, operations for sending one or more insights from a device to a cloud service on a cloud node in accordance with certain embodiments.

FIG. 12 illustrates, in a flow chart, operations for sending one or more insights from a device 152a to a cloud service 102 on a cloud node 100 in accordance with certain embodiments. Control begins at block 1200 with the device 152a receiving a subset of software modules, a subset of data, and a subset of network quality information from a cloud node. In certain embodiments, the subset of the network quality information includes information about network quality in one or more areas from one or more of the devices 152a . . . 152n.

In block 1202, the device 152a executes the one or more software modules to generate one or more insights from the data (e.g., insights regarding a route for the vehicle with the device 152a). In block 1204, the device 152a determines whether the network quality improved based on the subset of the network quality information. For example, as a device (as part of a vehicle) is moving through different areas, based on the network quality information, the device is able to determine whether there is network availability at a particular location. If so, processing continues to block 1206, otherwise, processing continues to block 1202. In block 1206, the device 152a sends the one or more insights to the cloud service 102. In block 1208, at an end of a duration of the subset of software modules and the subset of the data, the device 152a deletes the subset of software modules and the subset of data. In certain embodiments, the subset of the network quality information is also deleted based on the end of a duration.

Figure 13:
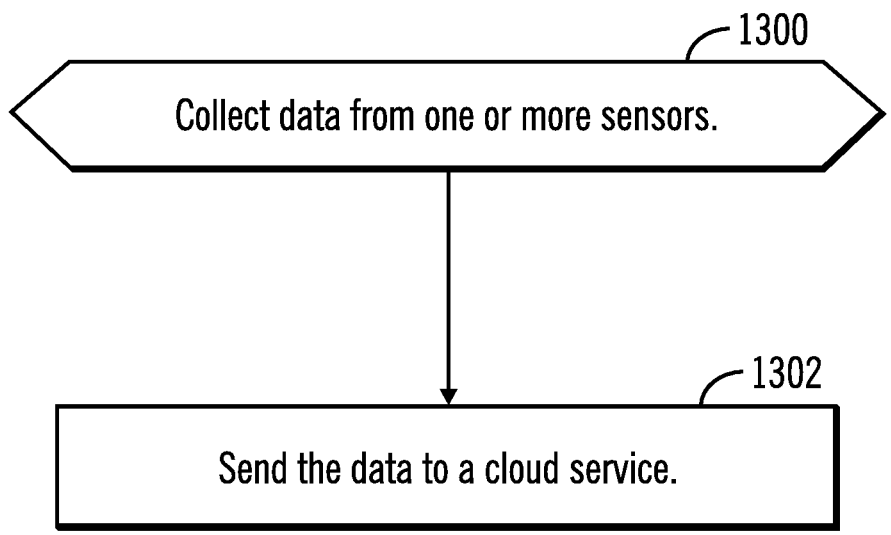
FIG. 13 illustrates, in a flow chart, operations for sending sensor data from a device to a cloud service on a cloud node in accordance with certain embodiments.

FIG. 13 illustrates, in a flow chart, operations for sending sensor data from a device to a cloud service 102 on a cloud node 100 in accordance with certain embodiments. Control begins at block 1300 with the device 152a collecting data from one or more sensors. In block 1302, the device 152a sends the data to the cloud service 102.

Figure 14:
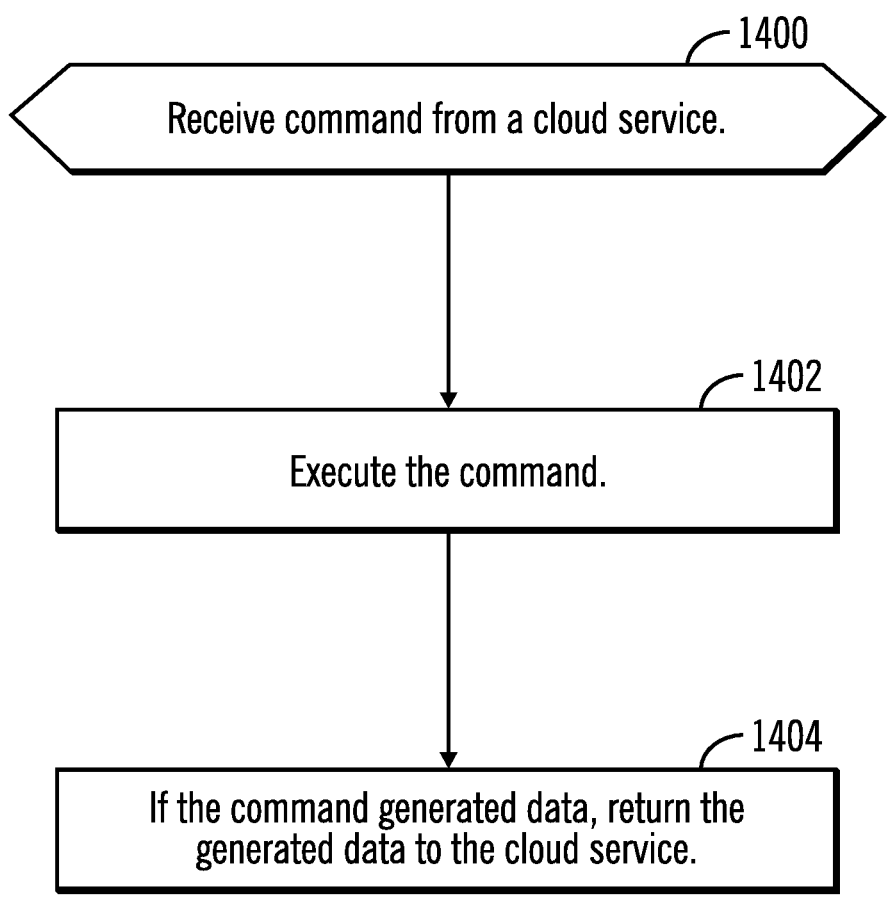
FIG. 14 illustrates, in a flow chart, operations for processing a command at a device in accordance with certain embodiments.

FIG. 14 illustrates, in a flow chart, operations for processing a command at a device in accordance with certain embodiments. Control begins at block 1400 with the device 152a receiving a command from the cloud service 102. In block 1402, the device 152a executes the command. In block 1404, if the command generated data, the device 152a returns the generated data to the cloud service 102.

By syncing the software modules, data, and network quality information between the cloud node 100 and the device 152a, embodiment advantageously allow the same processes performed on the cloud node 100 to be performed on the device 152a, even when the network is unavailable for the cloud node 100 and the device 152a to communicate with each other.

Advantageously, the cloud node 100 is able to predict that network quality is about to degrade and that the network may become unavailable as the device 152a moves along a trajectory path. In advance of the network becoming unavailable, the cloud node 100 advantageously syncs the software modules, data, and network quality information with the device 152a.

Since the synchronized data includes data (e.g., data originated from devices other than the device receiving the data) and results of an analysis on the cloud, a wide range of processes may be performed as compared with cases in which data for the device receiving the data is sent.

Since a subset of the software modules and a subset of the data are selectively synchronized, the impact on network traffic and resources (such as Central Processing Unit (CPU), memory, and storage) of the device 152a may be minimized.

Merely to enhance understanding of embodiments, examples are provided herein in which the insights are suggested routes. However, in other embodiments, other insights may be generated.

Figure 15:
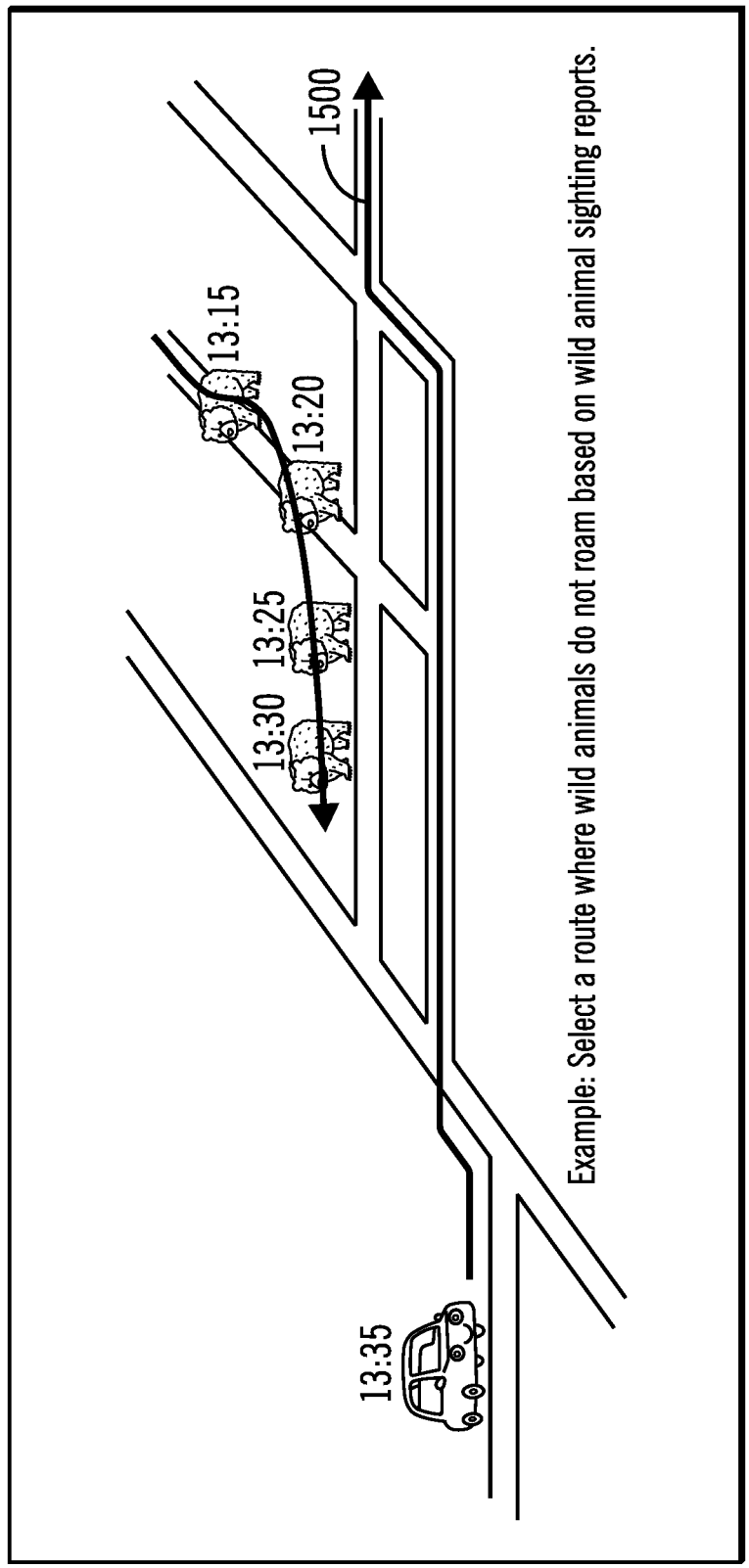
FIG. 15 illustrates an example route in accordance with certain embodiments.
Figure 16A:
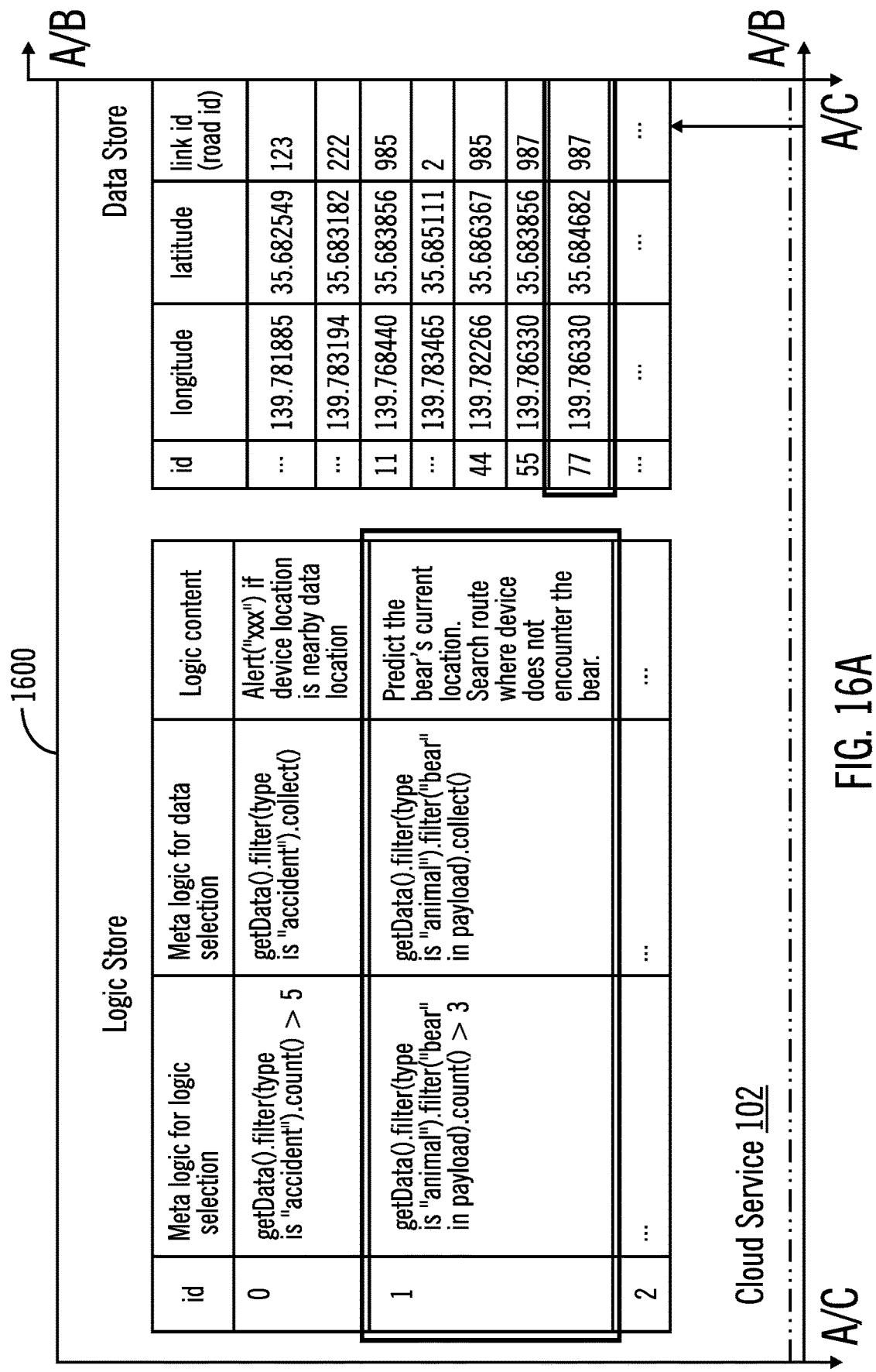
FIGS. 16A, 16B, 16C, and 16D illustrate a flow for the example route in accordance with certain embodiments.
Figure 16B:
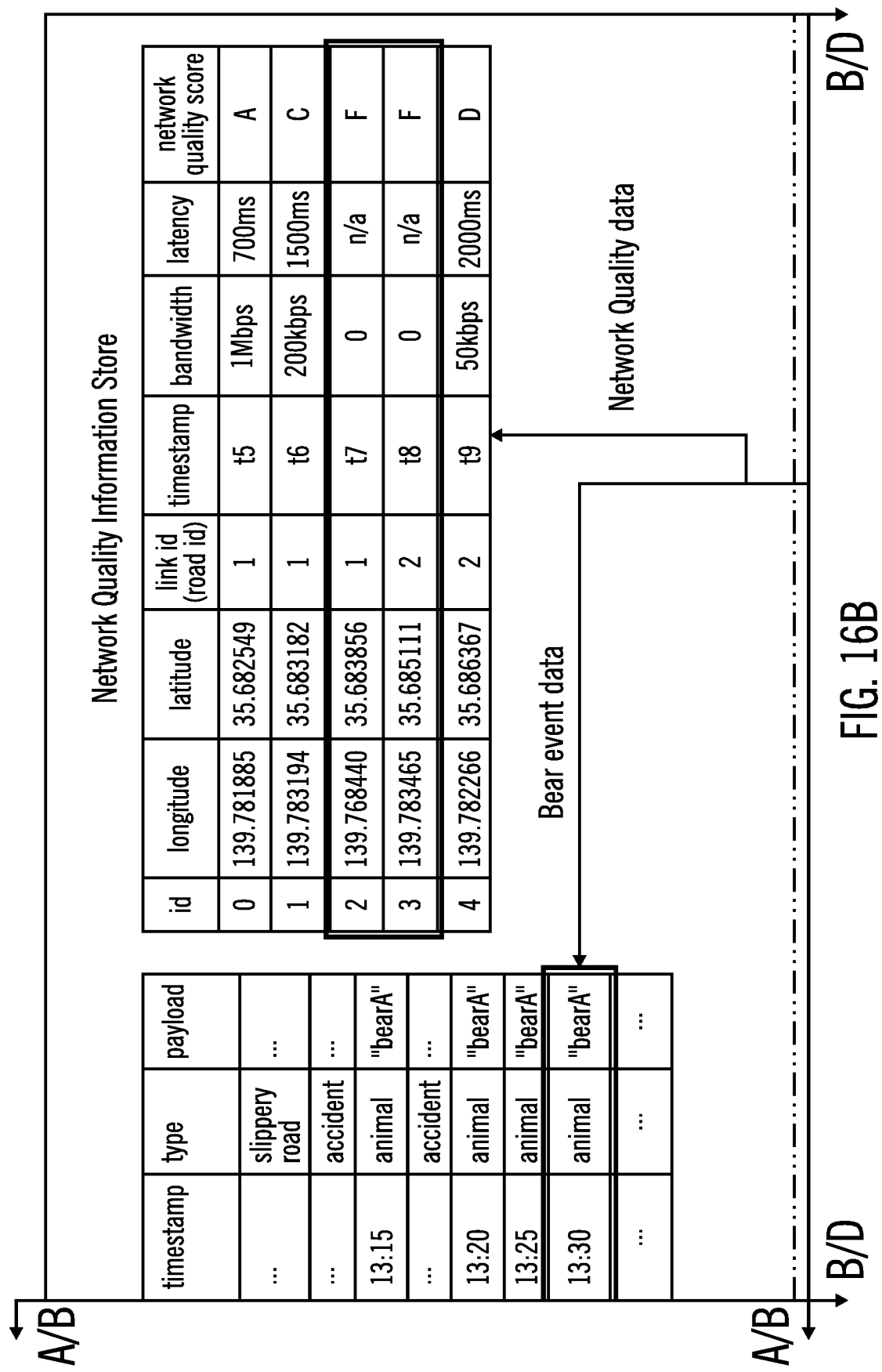
Figure 16C:
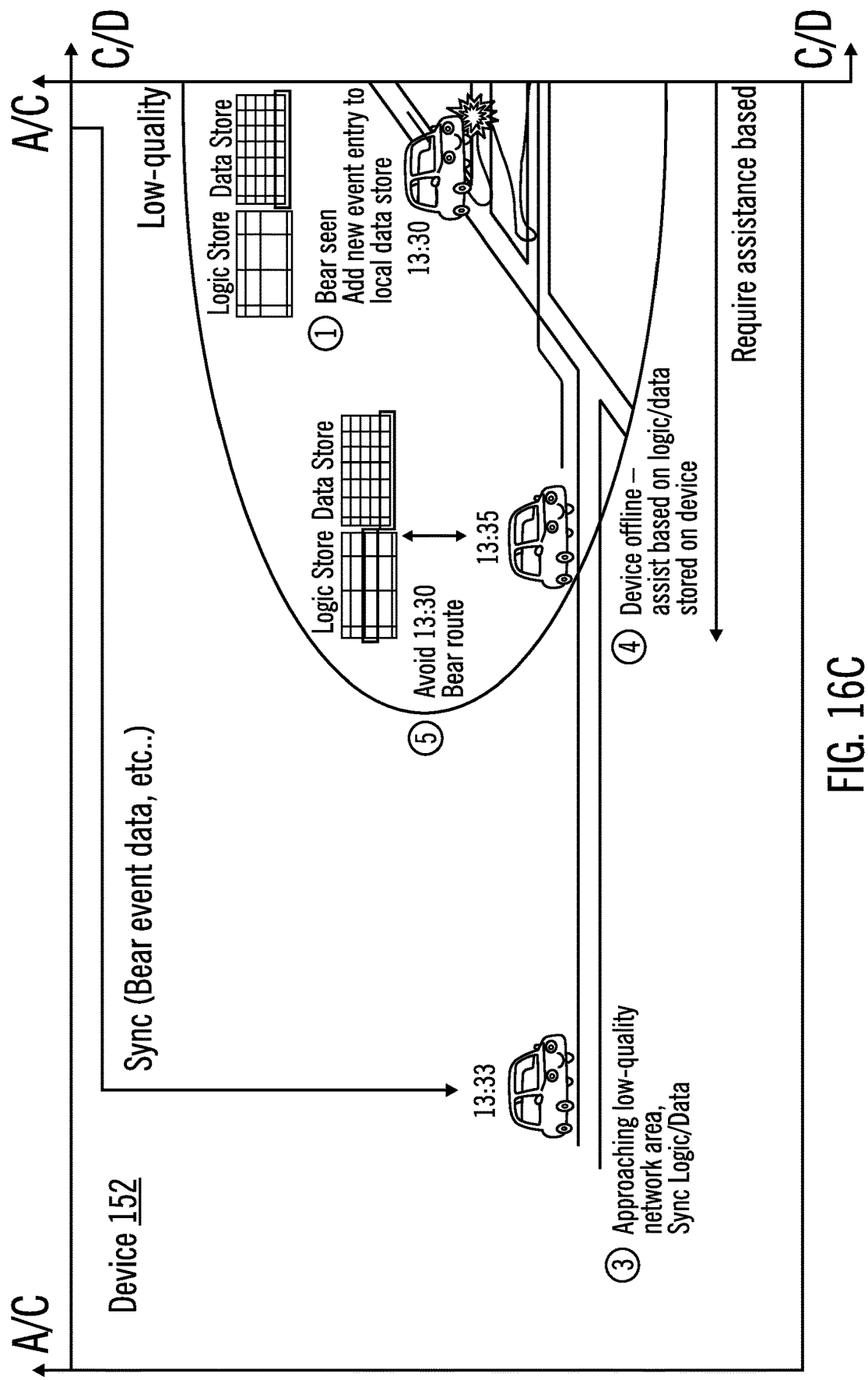
Figure 16D:
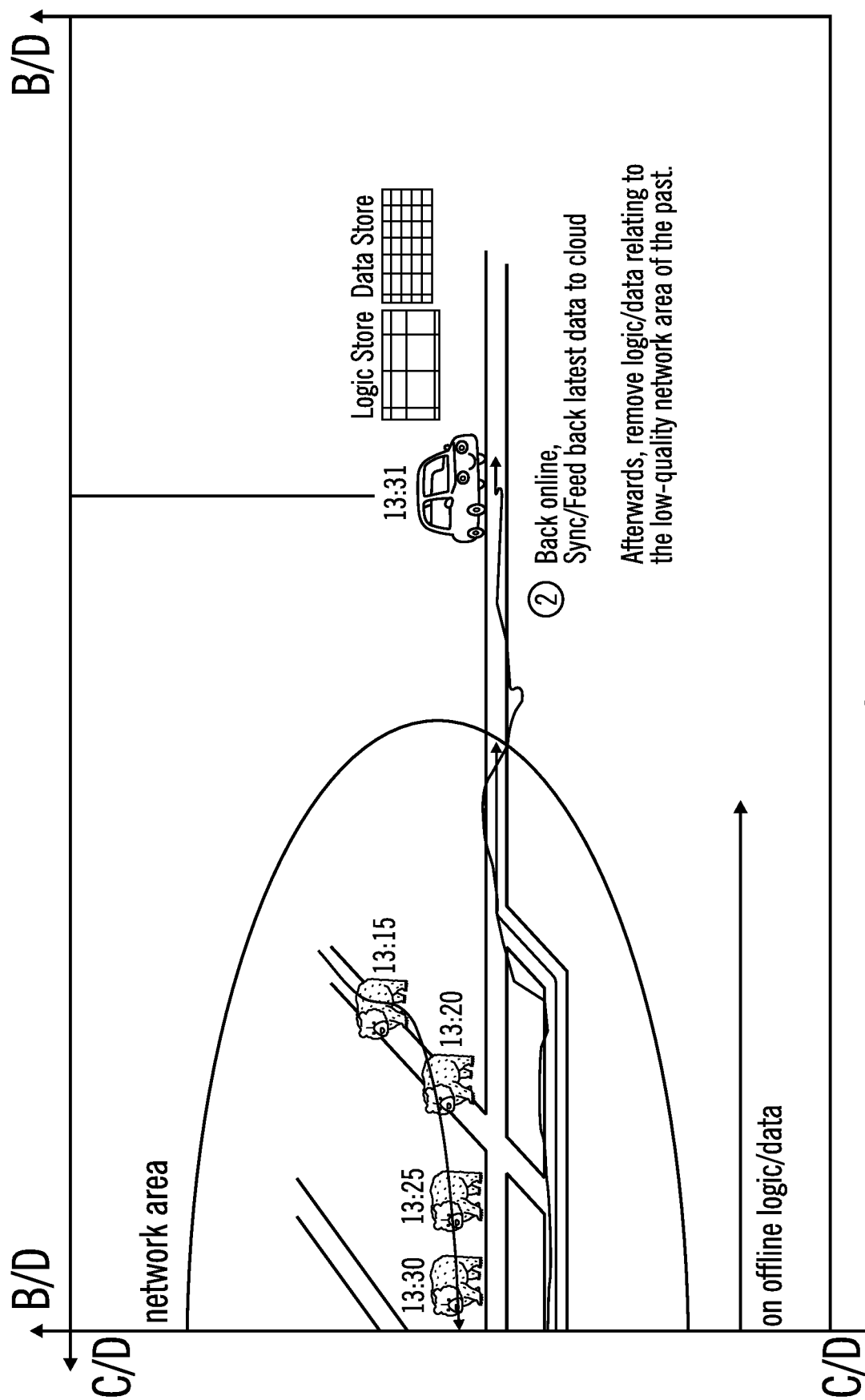

FIG. 15 illustrates an example route 1500 in accordance with certain embodiments. In this example, road information is provided in an area of a mountainous region where network connection is unavailable. In this area, synchronization of information about obstacles (e.g., such as fallen rocks, fallen objects, and animals) is performed before the device in the vehicle enters the area, thereby providing appropriate information to the device when the vehicle is approaching obstacles and before the network connection becomes unavailable. In FIG. 15, timestamps of 13:15, 13:20, 13:25, and 13:30 are associated with locations of the moving bear. Also, a timestamp of 13:35 is associated with the vehicle.

FIGS. 16A, 16B, 16C, and 16D illustrate a flow 1600 for the example route in accordance with certain embodiments. In this example, at a timestamp 13:33, before entering into a mountainous area, a vehicle receives software modules and data for an "animal on the road" event reported by another vehicle at 13:31. Consequently, even when the network connection is lost, a vehicle may select a route to avoid that animal.

Figure 17A:
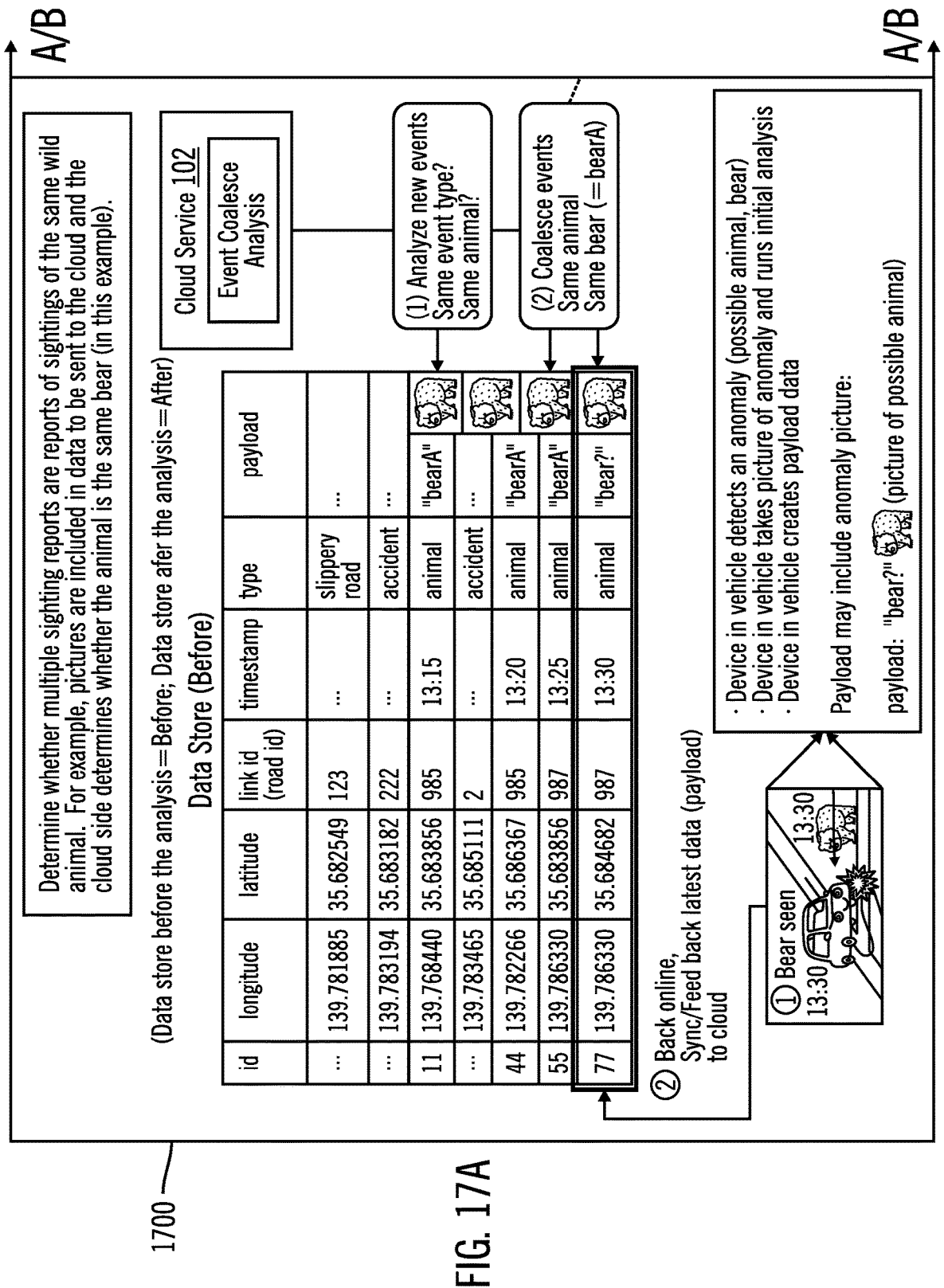

FIGS. 17A and 17B illustrates analysis 1700 at the cloud node for the example route in accordance with certain embodiments. With embodiments, the cloud-side logic analyzes the received event from each vehicle and detects whether it is a newly reported event or it is an update for an already-known event. In this example, the cloud-side logic executes image analysis and detects whether the reported animal is the same as the one already reported.

In an additional example, information about bad weather in a mountainous region where network connection is unavailable is provided. A device in a vehicle that has detected occurrence of fog in a mountainous region moves to a location where a network is available and then sends data indicating the time and location at which the device has detected the fog to the cloud node 100. Devices of multiple vehicles may perform this operation and send data indicating the times and locations at which fog occurred to the cloud node 100, which accumulates this data.

Then, immediately before a new vehicle enters the mountainous region, the data indicating the times and locations at which fog occurred and a fog prediction software modules are synchronized from the cloud node to a device of the new vehicle. Then, the device of the new vehicle uses the synchronized data and fog prediction software modules to predict the time and location at which fog will occur. The device uses the predicted time and location for drive assistance and for selecting a route for avoiding the fog. Embodiments also provide information for avoiding other weather issues (e.g., a tornado) or other obstacles (e.g., an avalanche).

In a further example, reports of sightings of pedestrians (or bicycles) in a tunnel where network connection is unavailable are provided. A device of a vehicle that has sighted pedestrians in a tunnel sends the time and location at which the vehicle has sighted the pedestrians to the cloud after the vehicle exits the tunnel. Devices of multiple vehicles perform this operation and send data indicating the times and locations at which pedestrians were sighted to the cloud node 100, which accumulates this data.

Immediately before a new vehicle enters the tunnel, the data indicating the times and locations at which pedestrians were sighted and a pedestrian location prediction software module are synchronized to the device of the new vehicle from the cloud node 100. The device of the new vehicle uses the synchronized data and pedestrian location prediction software module to predict the current location of the pedestrians and uses the predicted current location of the pedestrians for drive assistance.

In yet another example, information about road conditions in an area where network connection has become unavailable because of a natural disaster is provided. Network connection in an area becomes unavailable because a base station fails or access to the network is surging due to a disaster, such as a typhoon or torrential rain. A device of a vehicle that has passed through the area moves to a location where the network is available and sends up-to-the-minute data about communication conditions and road conditions (such as road severance or flood) and the time and location to the cloud node 100. Devices of multiple vehicles perform this operation and send data indicating the area where network connection is unavailable and road conditions to the cloud node 100, which accumulates this data.

Immediately before a new vehicle enters the area, data about road conditions and a related logic are synchronized from the cloud node 100. The device of the new vehicle uses the synchronized data and software modules to estimate a travelable road and uses the estimation for selection of a route for avoiding the severed or flooded road.

Thus, in certain embodiments, the cloud node 100 communicates with a plurality of devices of vehicles through a network. The cloud node 100 receives network quality information (indicating a network bandwidth and/or network latency) associated with locations of the vehicles and event information (indicating a slippery road, accident, animal, etc.) at the locations of the vehicles from the devices of the plurality of vehicles. The cloud node 100 determines a network disconnected area from a plurality of pieces of the network quality information. The cloud node 100 selects one or more software modules to be executed in the area, based on event information in the network disconnected area when it is predicted that a new vehicle will enter the network disconnected area. The cloud node 100 sends the selected one or more software modules and the event information in the network disconnected area to the new vehicle before the new vehicle enters the network disconnected area.

With embodiments, the cloud node 100 (1) associates a selection requirement with each of a plurality of software modules in advance and, (2) when a plurality of pieces of event information in a network disconnected area satisfy a selection requirement (e.g. when the number of pieces of given event information is greater than a threshold), selects a software module associated with the selection requirement.

With embodiments, the cloud node 100 analyzes a plurality of pieces of received event information and determines whether the plurality of pieces of event information are in the same event category (e.g. determines whether events are events of animals of the same species on the basis of an image analysis).

With embodiments, the cloud node 100 determines whether the new vehicle enters the network disconnected area by travel prediction based on the direction in which the first vehicle is moving.

Figure 18:
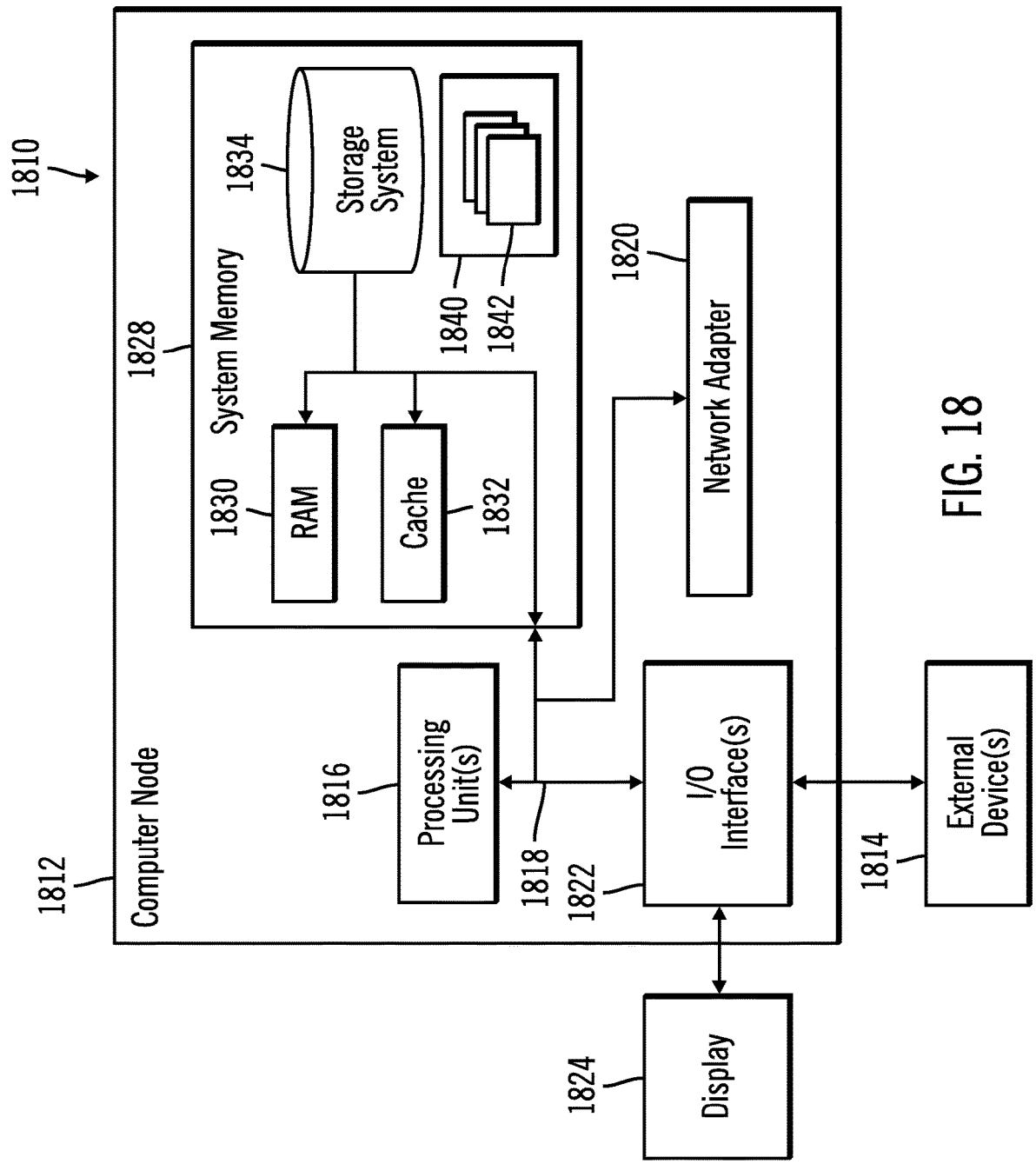
FIG. 18 illustrates a computing node in accordance with certain embodiments.

FIG. 18 illustrates a computing environment 1810 in accordance with certain embodiments. In certain embodiments, the computing environment is a cloud computing environment. Referring to FIG. 18, computer node 1812 is only one example of a suitable computing node and is not intended to suggest any limitation as to the scope of use or functionality of embodiments of the invention described herein. Regardless, computer node 1812 is capable of being implemented and/or performing any of the functionality set forth hereinabove.

The computer node 1812 may be a computer system, which is operational with numerous other general purpose or special purpose computing system environments or configurations. Examples of well-known computing systems, environments, and/or configurations that may be suitable for use with computer node 1812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1812 may be described in the general context of computer system executable instructions, such as program modules, being executed by a computer system. Generally, program modules may include routines, programs, objects, components, logic, data structures, and so on that perform particular tasks or implement particular abstract data types. Computer node 1812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, computer node 1812 is shown in the form of a general-purpose computing device. The components of computer node 1812 may include, but are not limited to, one or more processors or processing units 1816, a system memory 1828, and a bus 1818 that couples various system components including system memory 1828 to one or more processors or processing units 1816.

Bus 1818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1812 typically includes a variety of computer system readable media. Such media may be any available media that is accessible by computer node 1812, and it includes both volatile and non-volatile media, removable and non-removable media.

System memory 1828 can include computer system readable media in the form of volatile memory, such as random access memory (RAM) 1830 and/or cache memory 1832. Computer node 1812 may further include other removable/non-removable, volatile/non-volatile computer system storage media. By way of example only, storage system 1834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1818 by one or more data media interfaces. As will be further depicted and described below, system memory 1828 may include at least one program product having a set (e.g., at least one) of program modules that are configured to carry out the functions of embodiments of the invention.

Program/utility 1840, having a set (at least one) of program modules 1842, may be stored in system memory 1828 by way of example, and not limitation, as well as an operating system, one or more application programs, other program modules, and program data. Each of the operating system, one or more application programs, other program modules, and program data or some combination thereof, may include an implementation of a networking environment. Program modules 1842 generally carry out the functions and/or methodologies of embodiments of the invention as described herein.

Computer node 1812 may also communicate with one or more external devices 1814 such as a keyboard, a pointing device, a display 1824, etc.; one or more devices that enable a user to interact with computer node 1812; and/or any devices (e.g., network card, modem, etc.) that enable computer node 1812 to communicate with one or more other computing devices. Such communication can occur via Input/Output (I/O) interfaces 1822. Still yet, computer node 1812 can communicate with one or more networks such as a local area network (LAN), a general wide area network (WAN), and/or a public network (e.g., the Internet) via network adapter 1820. As depicted, network adapter 1820 communicates with the other components of computer node 1812 via bus 1818. It should be understood that although not shown, other hardware and/or software components could be used in conjunction with computer node 1812. Examples, include, but are not limited to: microcode, device drivers, redundant processing units, external disk drive arrays, RAID systems, tape drives, and data archival storage systems, etc.

In certain embodiments, the computing cloud node 100 and/or each device 152a . . . 152n has the architecture of computer node 1812.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 19:
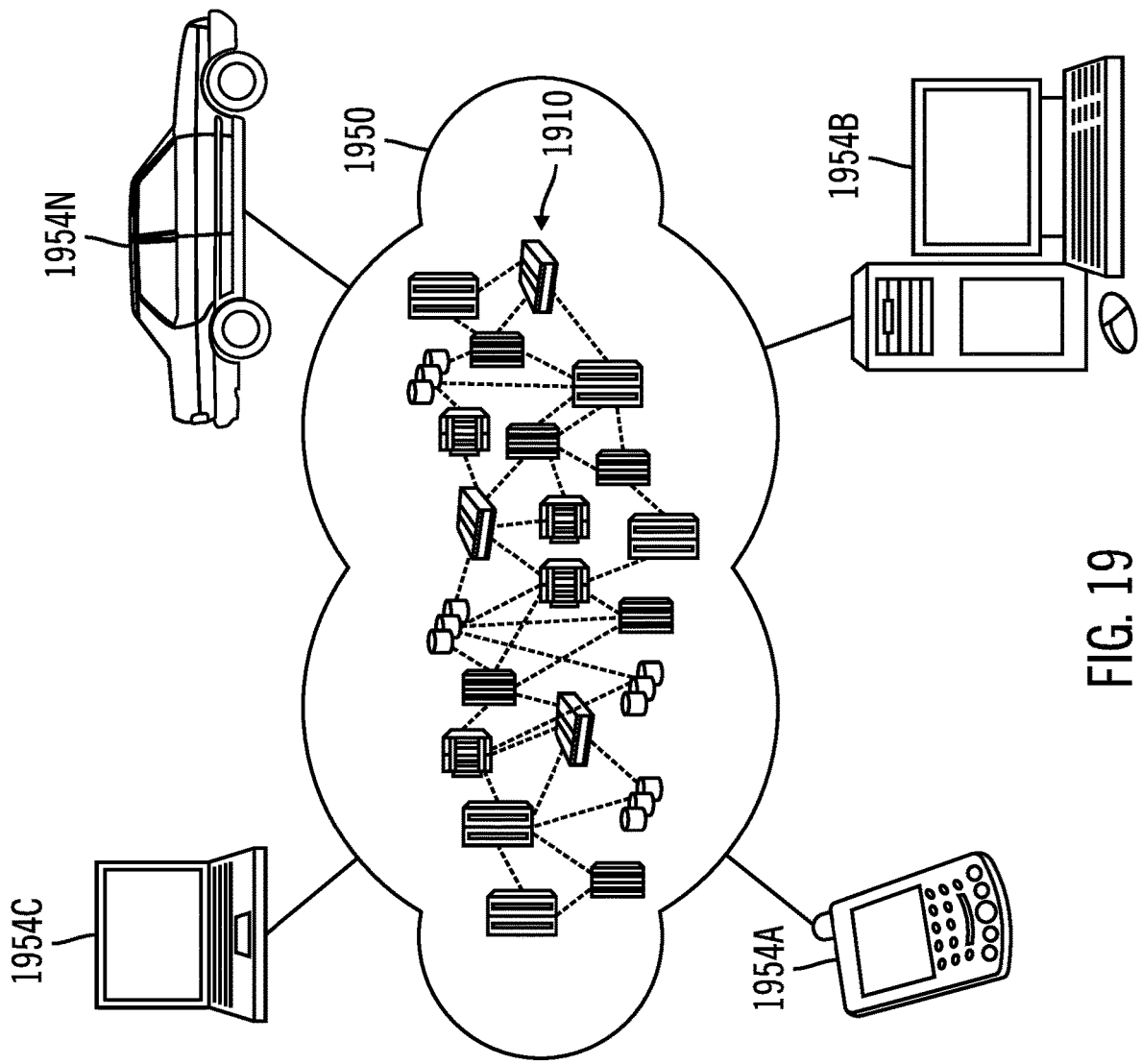
FIG. 19 illustrates a cloud computing environment in accordance with certain embodiments.

Referring now to FIG. 19, illustrative cloud computing environment 1950 is depicted. As shown, cloud computing environment 1950 includes one or more cloud computing nodes 1910 with which local computing devices used by cloud consumers, such as, for example, personal digital assistant (PDA) or cellular telephone 1954A, desktop computer 1954B, laptop computer 1954C, and/or automobile computer system 1954N may communicate. Nodes 1910 may communicate with one another. They may be grouped (not shown) physically or virtually, in one or more networks, such as Private, Community, Public, or Hybrid clouds as described hereinabove, or a combination thereof. This allows cloud computing environment 1950 to offer infrastructure, platforms and/or software as services for which a cloud consumer does not need to maintain resources on a local computing device. It is understood that the types of computing devices 1954A-N shown in FIG. 19 are intended to be illustrative only and that computing nodes 1910 and cloud computing environment 1950 can communicate with any type of computerized device over any type of network and/or network addressable connection (e.g., using a web browser).

Figure 20:
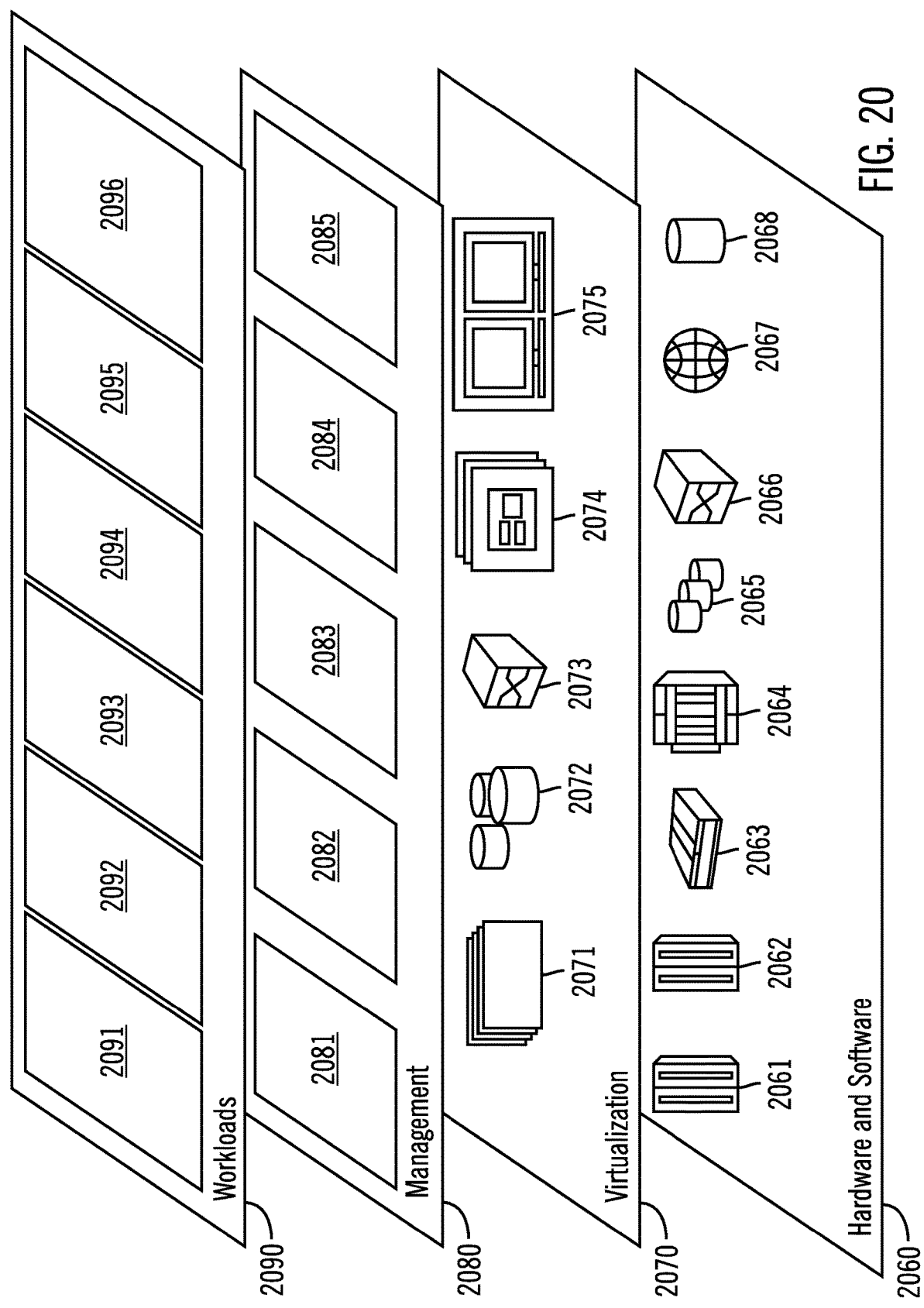
FIG. 20 illustrates abstraction model layers in accordance with certain embodiments.

Referring now to FIG. 20, a set of functional abstraction layers provided by cloud computing environment 1950 (FIG. 19) is shown. It should be understood in advance that the components, layers, and functions shown in FIG. 20 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and delegating cloud-side roles to devices 2096.

Thus, in certain embodiments, software or a program, implementing delegation of cloud-side roles to devices in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method, comprising operations for:
   receiving network quality information for a network from one or more devices;
   determining that the network is unavailable in an area from which the network quality information was received; and
   for a new device,
      predicting a trajectory path of the new device;
      determining that the new device is about to enter the area in which the network is unavailable based on the trajectory path;
      determining that the new device will disconnect from the network due to unavailability of the network in the area along the trajectory path;
      for each software module of a plurality of software modules,
         executing meta logic to determine whether the software module is to be selected based on the network quality information, wherein the meta logic comprises rules, and wherein the software modules comprise logic for performing data processing functions on data; and
         in response to determining that the software module is to be selected, adding the software module to a subset of software modules to be sent to the new device; and
      sending the subset of software modules and the data to the new device, wherein the new device executes the subset of software modules to generate one or more insights from the data while in the area in which the network is unavailable.

2. The computer-implemented method of claim 1, comprising further operations for:
   sending the network quality information to the new device, wherein the new device uses the network quality information to determine that the network has become available as the new device moves along the trajectory path to a new area.

3. The computer-implemented method of claim 1, comprising further operations for:
   creating time series data with the network quality information, wherein the network quality information includes network bandwidth and network latency;
   determining an average network bandwidth and an average latency using the time series data; and
   generating a network quality score of the area from the average network bandwidth and the average network latency, wherein the network quality score is used to determine that the network is unavailable in the area from which the network quality information was received.

4. The computer-implemented method of claim 3, comprising further operations for:
   multiplying the network quality score by an environmental coefficient.

5. The computer-implemented method of claim 1, wherein the subset of software modules and the data are deleted from the new device after a duration.

6. The computer-implemented method of claim 1, wherein the new device sends sensor information from one or more sensor devices to a cloud node.

7. The computer-implemented method of claim 1, wherein the new device is an Internet of Things (IoT) device.

8. The computer-implemented method of claim 1, wherein the operations of the computer-implemented method are provided as a service and executed on a cloud node.

9. A computer program product, the computer program product comprising a computer readable storage medium having program code embodied therewith, the program code executable by at least one processor to perform operations for:
receiving network quality information for a network from one or more devices;
determining that the network is unavailable in an area from which the network quality information was received; and
for a new device,
predicting a trajectory path of the new device;
determining that the new device is about to enter the area in which the network is unavailable based on the trajectory path;
determining that the new device will disconnect from the network due to unavailability of the network in the area along the trajectory path;
for each software module of a plurality of software modules,
executing meta logic to determine whether the software module is to be selected based on the network quality information, wherein the meta logic comprises rules, and wherein the software modules comprise logic for performing data processing functions on data; and
in response to determining that the software module is to be selected, adding the software module to a subset of software modules to be sent to the new device; and
sending the subset of software modules and the data to the new device, wherein the new device executes the subset of software modules to generate one or more insights from the data while in the area in which the network is unavailable.

10. The computer program product of claim 9, comprising further operations for:
sending the network quality information to the new device, wherein the new device uses the network quality information to determine that the network has become available as the new device moves along the trajectory path to a new area.

11. The computer program product of claim 9, comprising further operations for:
creating time series data with the network quality information, wherein the network quality information includes network bandwidth and network latency;
determining an average network bandwidth and an average latency using the time series data; and
generating a network quality score of the area from the average network bandwidth and the average network latency, wherein the network quality score is used to determine that the network is unavailable in the area from which the network quality information was received.

12. The computer program product of claim 11, comprising further operations for:
multiplying the network quality score by an environmental coefficient.

13. The computer program product of claim 9, wherein the subset of software modules and the data are deleted from the new device after a duration.

14. The computer program product of claim 9, wherein the new device sends sensor information from one or more sensor devices to a cloud node.

15. The computer program product of claim 9, wherein the new device is an Internet of Things (IoT) device.

16. The computer program product of claim 9, wherein the operations of the computer program product are provided as a service and executed on a cloud node.

17. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
receiving network quality information for a network from one or more devices;
determining that the network is unavailable in an area from which the network quality information was received; and
for a new device,
predicting a trajectory path of the new device;
determining that the new device is about to enter the area in which the network is unavailable based on the trajectory path;
determining that the new device will disconnect from the network due to unavailability of the network in the area along the trajectory path;
for each software module of a plurality of software modules,
executing meta logic to determine whether the software module is to be selected based on the network quality information, wherein the meta logic comprises rules, and wherein the software modules comprise logic for performing data processing functions on data; and
in response to determining that the software module is to be selected, adding the software module to a subset of software modules to be sent to the new device; and
sending the subset of software modules and the data to the new device, wherein the new device executes the subset of software modules to generate one or more insights from the data while in the area in which the network is unavailable.

18. The computer system of claim 17, comprising further operations for:
sending the network quality information to the new device, wherein the new device uses the network quality information to determine that the network has become available as the new device moves along the trajectory path to a new area.

19. The computer system of claim 17, comprising further operations for:
creating time series data with the network quality information, wherein the network quality information includes network bandwidth and network latency;

determining an average network bandwidth and an average latency using the time series data; and generating a network quality score of the area from the average network bandwidth and the average network latency, wherein the network quality score is used to determine that the network is unavailable in the area from which the network quality information was received.

20. The computer system of claim 19, comprising further operations for:

multiplying the network quality score by an environmental coefficient.

21. The computer system of claim 17, wherein the subset of software modules and the data are deleted from the new device after a duration.

22. The computer system of claim 17, wherein the new device sends sensor information from one or more sensor devices to a cloud node.

23. The computer system of claim 17, wherein the new device is an Internet of Things (IoT) device.

24. The computer system of claim 17, wherein the operations of the computer system are provided as a service and executed on the computer system, and wherein the computer system comprises a cloud node.

* * * * *